(12) United States Patent
Reddy et al.

(10) Patent No.: US 11,709,479 B1
(45) Date of Patent: Jul. 25, 2023

(54) SYSTEMS AND METHODS FOR DYNAMIC CHLORINATOR OPERATION

(71) Applicant: Swim Sense, LLC, Pompano Beach, FL (US)

(72) Inventors: Rakesh Reddy, Boca Raton, FL (US); Kevin Doyle, Pompano Beach, FL (US)

(73) Assignee: Swim Sense, LLC, Pompano Beach, FL (US)

( * ) Notice: Subject to any disclaimer, the term of this patent is extended or adjusted under 35 U.S.C. 154(b) by 0 days.

(21) Appl. No.: 17/893,528

(22) Filed: Aug. 23, 2022

(51) Int. Cl.
*G05B 19/416* (2006.01)

(52) U.S. Cl.
CPC .. *G05B 19/416* (2013.01); *G05B 2219/37371* (2013.01)

(58) Field of Classification Search
CPC ................... G05B 19/416; G05B 2219/37371
See application file for complete search history.

(56) References Cited

U.S. PATENT DOCUMENTS

| | | | |
|---|---|---|---|
| 7,695,613 B2 | 4/2010 | Doyle | |
| 9,416,034 B2 | 8/2016 | Johnson | |
| 9,834,451 B2 | 12/2017 | Miller | |
| 10,472,263 B2 | 11/2019 | Johnson | |
| 10,492,268 B2 | 11/2019 | Potucek | |
| 10,737,951 B2 | 8/2020 | Miller | |
| 10,801,225 B1 | 10/2020 | Reddy | |
| 11,097,958 B2 | 8/2021 | Miller | |
| 11,108,585 B2 | 8/2021 | Khalid | |
| 2014/0273052 A1 | 9/2014 | Reddy | |
| 2016/0123950 A1 | 5/2016 | Howes, Jr. | |
| 2016/0340205 A1* | 11/2016 | Murdock | C02F 1/4674 |
| 2018/0240322 A1* | 8/2018 | Potucek | E04H 4/14 |
| 2018/0273404 A1* | 9/2018 | Denkewicz, Jr. | C02F 1/4674 |
| 2019/0105226 A1* | 4/2019 | Potucek | F04D 15/0218 |
| 2019/0158307 A1* | 5/2019 | Khalid | H04W 4/80 |
| 2020/0270889 A1 | 8/2020 | Buosanto | |
| 2021/0380435 A1 | 12/2021 | Miller | |

FOREIGN PATENT DOCUMENTS

| | | |
|---|---|---|
| AU | 2022000316 | 2/2022 |
| WO | WO2021091773 | 5/2021 |

* cited by examiner

*Primary Examiner* — Christopher E. Everett
(74) *Attorney, Agent, or Firm* — Clayton, McKay & Bailey, PC

(57) ABSTRACT

Systems and methods for dynamically controlling chlorinator operations based on chlorine demand may include receiving an operation command associated with a chlorinator for a fluid system with a chlorinator operation management controller ("management controller"). The management controller may determine a remaining runtime for the chlorinator and access measured values for fluid conditions from a plurality of fluid condition sensors for fluid of the fluid system. The management controller may determine a current chlorine demand based on the measured fluid conditions and a predetermined threshold for a chlorine level for the fluid. An operation of the chlorinator between an active state and an inactive state may be caused by the controller based on the current chlorine demand, the remaining runtime, and a configuration of components for the fluid system. Causing the operation of the chlorinator may include managing operations of a legacy control for the chlorinator.

20 Claims, 11 Drawing Sheets

SYSTEMS AND METHODS FOR DYNAMIC CHLORINATOR OPERATION

BACKGROUND

Fluid systems including chlorinators, particularly those systems installed for swimming pools, are subject to different factors that can change the amount of chlorine needed to maintain fluid within the fluid system at prescribed sanitation levels. These factors can include environmental conditions, levels of use, and periods of use that can vary unpredictably—both with respect schedule and magnitude. However, typical chlorinators, particularly those employed in fluid systems installed in residential swimming pools, are operated for preset periods of time without consideration for actual real-time demand for chlorine. As a result, the previously mentioned chlorinators often produce chlorine, and expend portions of respective finite total runtimes, over periods when additional chlorine generation is not required. Accordingly, very few chlorinators are operated in a way such that utilization of finite total runtimes is optimized and service lives for the chlorinators are maximized. The following description of chlorinators and examples are illustrative of the issue described above.

A chlorinator may include a cell with terminals connected to blades that are positioned within a flow of fluid. The blades are coated (e.g., with ruthenium oxide) such that when power is supplied through the terminals, for each pair of adjacent blades, one blade becomes a cathode and the other blade becomes an anode. As a result, supplying power to the blades while fluid flows between and past the blades causes electrolysis with dissolved salt in the fluid and generation of chlorine. The amount of chlorine that can be generated at any given instance of time when power is being supplied depends on the amount of dissolved salt in the fluid, electrical current through and runtime of the cell, and the number of blades in the chlorinator.

Settings for operating chlorinators can vary, but a common scheme is to define a cycle in terms of a measure of time (e.g., 1 minute, 30 minutes, an hour), and provide percentages of the cycle as options for supplying power to the chlorinator. Thus, if a cycle is defined as one hour, and the chlorinator is set to a 50% setting, power may be supplied to the chlorinator for the first 30 continuous minutes of the next hour or next number of hours defined by a user, a fluid system control panel, or another chlorinator operation command source.

In many fluid systems, chlorinators may be plumbed into a system, such as a swimming pool installation, and setup according to an open loop control scheme. A timer box or control panel may control the duration that a chlorinator will run—for example 8 hours a day. Timing does not change automatically based on system demand for sanitization. For example, cold weather requires less sanitation, whereas rainy days require more sanitation. However, operation of the chlorinator remains under the preset time and does not varying to meet changing demands.

In practice, it is common for chlorinator suppliers to warranty the service life of the chlorinators they sell. The amount of time selected for the warranty corresponds to the number of blades included in a chlorinator, also referred to as the size of the chlorinator. The number of blades dictates how much total chlorine a chlorinator can produce (its total runtime). Different models of chlorinators may have different numbers of blades depending on the size of the fluid system (pool or spa) that the particular model is intended for. However, it is common practice for fluid system builders to purchase and install chlorinators that are smaller/have lower capacity than what is required by a fluid system to save on cost during construction. To ensure that required sanitation levels are maintained, the undersized chlorinators may be run 100% of the time. In turn, the total runtimes for these chlorinators are exhausted over periods of time that fall far short of their warrantied service lives. Thus, leaving suppliers with the obligation to either provide another chlorinator or issue rebates to end-users of the fluid systems where the undersized chlorinators were installed.

As a result, a need exists for systems and methods that dynamically control chlorinators based on actual real-time demand for chlorine needed to maintain or change sanitation levels required for safe operation and usage of fluid systems.

SUMMARY

Examples described herein include systems and methods for dynamic chlorinator operation. In one example, an operation command associated with a chlorinator for a fluid system may be received with a chlorinator operation management controller ("management controller"). The management controller may determine a used runtime and a remaining runtime for the chlorinator, and access measured values for fluid conditions, such as power of Hydrogen ("pH"), Oxidation Reduction Potential ("ORP"), and temperature, from a plurality of fluid condition sensors. Furthermore, the management controller may determine a current chlorine demand based on the measured fluid conditions and a predetermined threshold for the desired chlorine level for the fluid. An operation of the chlorinator between an active state and an inactive state may be caused by the management controller based on the current chlorine demand, the remaining runtime, and a configuration of components for the fluid system. In one example according to the present disclosure, causing the operation of the chlorinator may include managing operations of a legacy controller for the chlorinator. In another example, the management controller can continuously track operational information for the chlorinator including at least the remaining runtime.

At a high level, dynamic chlorinator operation comprises obtaining information about a fluid, manipulating and using the data to determine a command based on chlorine demand, and operating a chlorinator cell between an active state in which it generates chlorine and inactive where it does not. More specifically, in one example, a core functionality provided by the systems and methods of the present disclosure includes an ability to switch a chlorinator On/Off based on a real Free Chlorine value. Precise measurements of fluid conditions may be utilized in the methods and systems described herein to an actual and immediate need for a chlorinator to be in an active state or in an inactive state. In one example, Real Free Chlorine present in a fluid may be determined based on a temperature, a level of pH and ORP of the fluid. In addition, salinity of the fluid may be detected and used to determine a capacity for chlorinator operation alone to meet chlorine demands or how much salt must be added to the fluid for sufficient chlorine generation.

The systems and methods herein provide continuous and precise demand-based control over chlorinator operations that ensure fluid in a system such as a pool or spa is not over or under chlorinated, is less likely to affect swimmers negatively (e.g., red eyes, skin irritation, offensive smells), and doesn't suffer from a high or low level of salinity. In the context of swimming pools and spas, the methods and systems described herein can allow pool owners access to information and tools that he or she uses for maintenance (e.g., by a pool service technician).

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
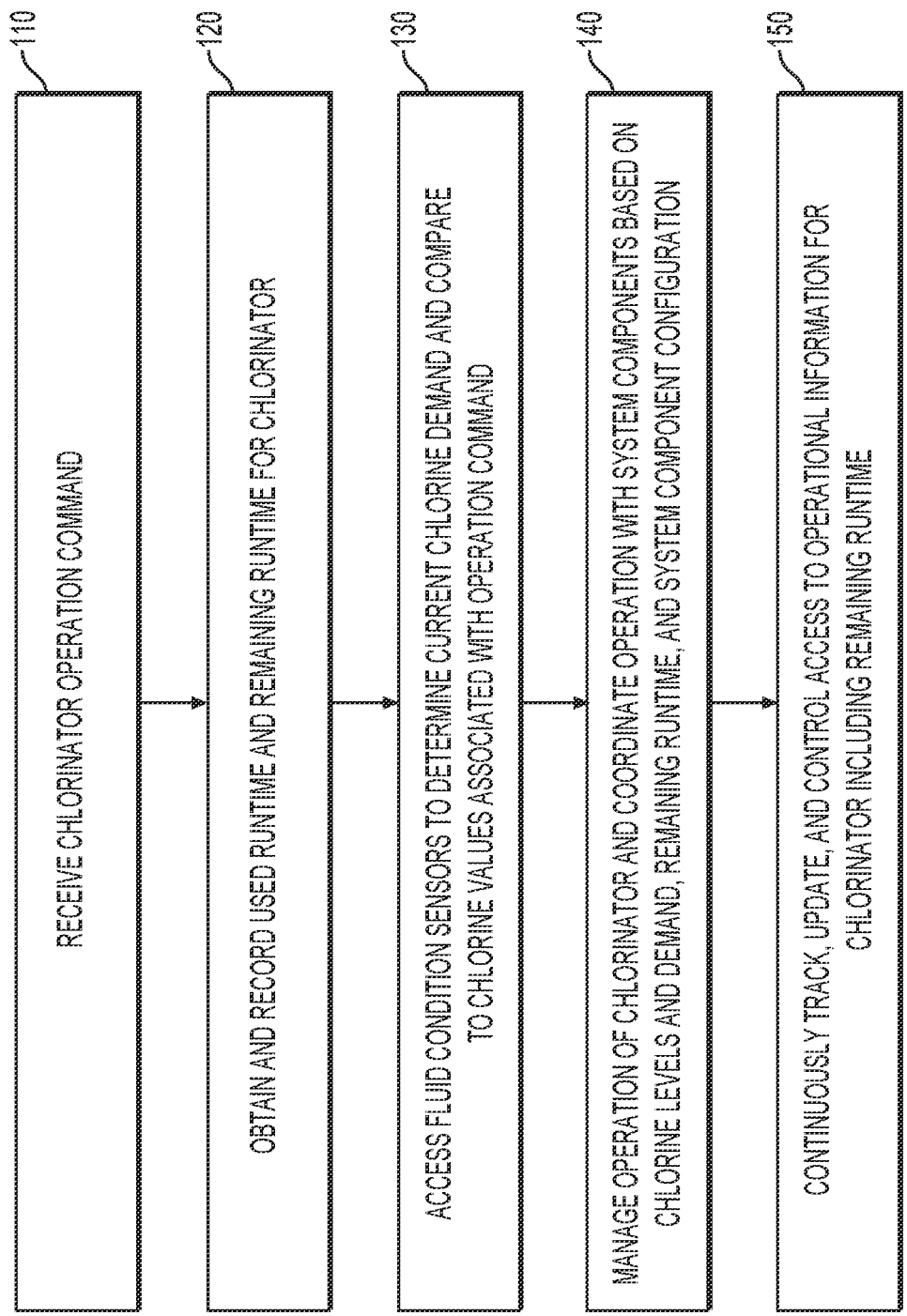
FIG. 1 is a flowchart of an example method for managing operations of a chlorinator for a fluid system based on chlorine demand.

FIG. 1 is a flowchart of an example method for managing operations of a chlorinator for a fluid system based on chlorine demand.

In stage 110, a chlorinator operation management controller ("COMC" or "management controller") according to an aspect the present disclosure, can monitor an operation status of a chlorinator for a fluid system, and receive an operation command for the chlorinator.

In one example, the chlorinator may include a cell and a legacy control. A cell may include a plurality of blades and terminals or other types of connectors that apply an electric differential across the blades. Terminals or other types of connectors of the cell may be electrically connected to the legacy control. The legacy control may be comprised of a driver, or a chlorinator-specific controller, or a combined chlorinator-specific controller and power supply, or a timer box and a power supply, or other device or combination of devices that serve to generally meter an immediate supply of power to a chlorinator cell. Put in other terms, the legacy control may serve to actuate and terminate processes directly and at the chlorinator, that cause the chlorinator to generate chlorine. In some examples, the legacy control may be electrically and communicatively connected to a source of operation commands and/or a power supply.

In one example, a fluid system for which the exemplary method is performed may include the chlorinator, a pump, a power supply, at least one source of operation commands (legacy control) for the chlorinator, and the management controller.

In one example, the operation command may include a selection of one of several pre-set runtime schemes, each scheme including a time for a cycle and a fixed percentage of runtime per cycle for the chlorinator to be in an active state of generating chlorine. In another example, the operation command may include a command to put the chlorinator in an active state continuously for a single duration of time (e.g., 4, 6, or 8 hours). In still another example, the operation command may include one of the above-mentioned chlorinator-specific commands and specify a sanitation level for the fluid system. A sanitation level can specify, at minimum, a value or range for a chlorine level that needs to be maintained in the fluid system. In another example, the sanitation level can specify a chlorine level and values or ranges for other fluid conditions such as alkalinity, dissolved oxygen, water hardness, nitrates, calcium, and the like.

In one example, the operation command is generated by an operation command source can be one of a user, a legacy control for the chlorinator, a combination of a timer and a power supply, a fluid system control panel ("FSC panel") such as a pool and spa control panel, and an external control not constituting an FSC panel. The components of the operation command may depend on the type of operation command source, but generally may include a communication that results in the legacy control causing the chlorinator to go into an active state and generate chlorine for: (A) some fixed period of time and the go inactive; or (B) a portion of a cycle of particular length of time for a certain number of cycles. In any event, the operation command does not specify or enable a chlorinator to operate under any type of dynamic control scheme that is based on an actual demand in the fluid system for chlorine.

In other fluid systems including chlorinators, a legacy control maybe packaged with a chlorinator cell and an external power supply is connected to the chlorinator. Information from the chlorinator (i.e., at the legacy control) is not processed at any point other than at the legacy control absent the external controller or the FSC panel. If a power supply for the chlorinator is part of an actuator that includes a communication module that can be connected to an external controller, the external controller may be able to request and receive information (e.g., salinity, temperature, chlorine output) from the chlorinator. Accordingly, the operation command may be received by the management controller as a result of monitoring the activity by the legacy control.

At stage 120, a used runtime and a remaining runtime for the chlorinator can be obtained and recorded. In one example, at the time a chlorinator is put into service, a total runtime may be determined by, input through, or registered via, for example, a management controller and/or a chlorinator operation management control backend ("COMC backend" or "backend"). Stage 120 can include accessing total and used runtime information which is used to estimate the remaining runtime. A log of used and remaining runtimes may be updated in stage 120 once the remaining runtime is determined. For each entry, the log may include information associated with when the remaining runtime was determined such as the time, date, sampling rate, duration since a last recording/estimation, and other information made accessible to a management controller or backend such as fluid condition sensor readings (e.g., temperature, pH, ORP, salinity, flow rates, Free Chlorine, etc.).

In one example, information including a number and size of blades may be accessed and used to calculate the total runtime for a new chlorinator. In another example, model information may be obtained from the chlorinator and used to look up a total runtime from a database accessible by a management controller or backend. In another example, a serial number of the chlorinator may be obtained and used to look up a total runtime or a remaining runtime from a database used to record total and used runtimes for new and in-service chlorinators.

In still another example, at the time a chlorinator is put in service, a user may input information that is used to determine, set, or otherwise establish a total runtime. A user may utilize a user interface to provide a number and size of blades, a total runtime, a model number, or a serial number for a new chlorinator. Alternatively, if known, a user may input a remaining runtime for a used chlorinator that is being put back in service. A user interface may be provided by a component of a fluid system, such as a fluid system control panel, that communicates with a management controller and/or backend. In another example, input may be provided via an interface that is dedicated to the management controller or backend and implemented through a hardware-based component (e.g., touch screen, panel, etc.) or a software product, such as an application, running on a computing device. As used herein, a computing device may include any processor-enabled device, such as a laptop, tablet, personal computer, phone, or hardware-based server.

Further in stage 120, a value for used runtime may be referenced or estimated. As noted above, the management controller or backend may maintain or otherwise have access to a log including past recorded runtimes. The management controller can continuously reference and update the used runtime as time passes in a loop independent of the chlorinator operations. In another example, at all times when the chlorinator is active, the management controller can track (count) how much time has elapsed since the chlorinator was inactive. At the next instance that the chlorinator goes inactive, the management controller can add the tracked interval of time to the previously recorded value for the used runtime.

In another embodiment, one of or a combination of these schemes may be selectively implemented based on what a next or series of next chlorinator operations includes. For example, where the management controller determines that the chlorinator will be continuously active for the next four hours, the cumulative scheme where time is added to the used runtime as the chlorinator is active may be implemented. In another exemplary situation, the operation of the chlorinator that the management controller is set to implement may involve the chlorinator being active for a set or varying percentage of each of the next four hours (or set or varying sub-intervals within each hour). The management controller may update the used runtime each time the chlorinator goes from active to inactive by adding a total amount of time the chlorinator was active since it was last inactive to the used time value the management controller has stored or has access to (e.g., via a backend).

In yet another example, the scheme by which the used runtime is updated may depend on a rate at which fluid condition sensors are sampled. More specifically, where management controller is set to sample the fluid condition sensors frequently (e.g., every second), the used runtime may be updated under the cumulative scheme as a result of the chlorinator going from active to inactive without any type of schedule and/or no preset time intervals. Thus, the updated scheme for the used runtime may be selected and implemented responsive to real-time determinations of chlorine demand and corresponding operations of the chlorinator as caused by the management controller.

In stage 130, fluid condition sensors for the fluid system may be accessed and a current chlorine level and demand for chlorine may be determined. In addition, a chlorine level that may potentially persist in the fluid system with a full implementation of the operation command (hereafter referred to as "command chlorine level") and associated demand ("command chlorine demand") may be estimated or otherwise derived in stage 130. A comparison involving the above-described current and command chlorine values may be carried out, for example, by a management controller. In turn, the comparison can be used, as described in more detail herein, to evaluate an operation command and actuate chlorinator operations that optimize the usage of a total runtime to maximize a service life of a newly installed chlorinator. In the case of a chlorinator put into service prior to the installation of a management controller, the comparison may be utilized to actuate chlorinator operations that optimize usage of a remaining runtime to maximize a remaining service life of the previously installed chlorinator.

The fluid conditions sensors may include, but are not limited to pH, ORP, temperature, flow, and salinity sensors. In one example, the fluid condition sensors can be individually installed in the fluid system at different locations. In one example, the flow rate sensor may be comprised of two flow sensors that include a sensor that measures flow rate installed in a fluid system upstream of a chlorinator. A second flow sensor may be provided by the chlorinator and be configured to detect the presence of a fluid flow and/or a flow rate of a fluid flow when present. In addition to a flow sensor, the chlorinator may provide salinity sensor which measures an amount of dissolved salt within the fluid passing through the chlorinator.

The current chlorine demand may be determined based on an amount of Free Chlorine in the fluid that can be calculated from pH and ORP values, as is known in the art. This current measured/determined value of Free Chlorine (hereafter referred to as "current chlorine level") may be measured in parts per million (ppm). A chlorine threshold or limiting range (hereafter referred to as "required chlorine level") associated with a sanitation level at which the fluid system must be maintained, may be utilized as a benchmark for determining the current chlorine demand. More specifically, the current chlorine demand may be determined in stage 130 as a differential between the current and required chlorine levels.

In one example, a sanitation level may be encompassed by the required chlorine level, whether that be a single threshold value or a range of values. In another example, the sanitation level may encompass the required chlorine level and other parameters. In one example, ranges and limits for those parameters encompassed by a sanitation level may correspond to an industry standard or be specified by regulations promulgated by a government, a private entity, an association, commercial organization, or other type of governing body.

The command chlorine level and demand values may be determined based on the current chlorine level and an estimate of the cumulative effect of the command operation on the chlorine level in the fluid system at certain benchmark times or completion percentages of an execution of the operation command. Thus, the command chlorine level may include one or more projected chlorine levels that may result from generating chlorine pursuant to the command operation at different stages thereof. These projected chlorine levels may be compared to a required chlorine level or values specified in a schedule of required chlorine levels at times that correspond to times for the projected (required) chlorine levels.

At stage 140, operation of the chlorinator may be managed based on the runtime info determined in stage 120 and chlorine levels determined in stage 130. In addition, the operations may be coordinated with fluid system components involved, directly and indirectly, with operations of the chlorinator. Management and coordination in stage 140 may be performed by a management controller or combination of a management controller and COMC backend based on current and command chlorine and demands, the remaining runtime for the chlorinator, and a configuration of fluid system components.

In one example, coordination in stage 140 may include, the management controller operating to provide an FSC panel that was the operation command source, as much information as required for the FSC panel to move on to another device it controls as part of a performance monitoring mode. In another example, when an FSC panel polls for salinity or temperature from a legacy control located either at the chlorinator or a power actuator, the management controller may respond with values for those fluid conditions.

In still other examples, the management controller may cease to have power when an FSC panel or wall timer disconnects power to the chlorinator. In this situation, coordination in stage 140 may include a remote server provided as part of the COMC backend exercising an ability to differentiate between a scheduled power off and an issue with a power connection at the management controller. Further, the management controller may not reply to a control panel with any data if the chlorinator is not plugged-in, to simulate the chlorinator not being plugged-in to the control panel directly. However, the chlorinator may be controlled to continue operation in an active state based on control by the management controller is there is a demand for chlorine.

In still other examples, a management controller according to the present controller can implement operation management of a chlorinator by causing current magnitude and duty cycle of power supply to modified. This can include single/one-time modifications or modulations of current and duty cycle.

In stage 150, a management controller or a combination of a management controller and COMC backend may continuously track, update, and control access to operational information which includes remaining runtime for the chlorinator. In one example, the management controller can check a status of the chlorinator and if active, update a used runtime log. The management controller may determine whether the update should be a one-time update or involve continuous updating. In addition, the management controller may be configured to determine (and log), continuously, an accurate up-to-date remaining runtime for the chlorinator on a real-time basis.

In one example, the management controller can track active and inactive time for a chlorinator on a seasonal basis or other predefined amount of time. For example, the management controller, can track a total amount of time a chlorinator was active during a winter period for an area where the fluid system is located. In the same way, the management controller can track total active time during summer months. This information will be valuable for planning purposes but it also represents a tangible benefit reaped from the need-based chlorinator operation implemented by the management controller. That is, portions of a total runtime for the chlorinator were only used over the course of those seasonal time periods, when it was necessary to produce chlorine. Thus, a situation where a chlorinator is run for the same amount of time for the winter and the summer, where a demand for one is half the demand of the other, because an operator forgot to change a setting, is completely avoided.

Figure 2:
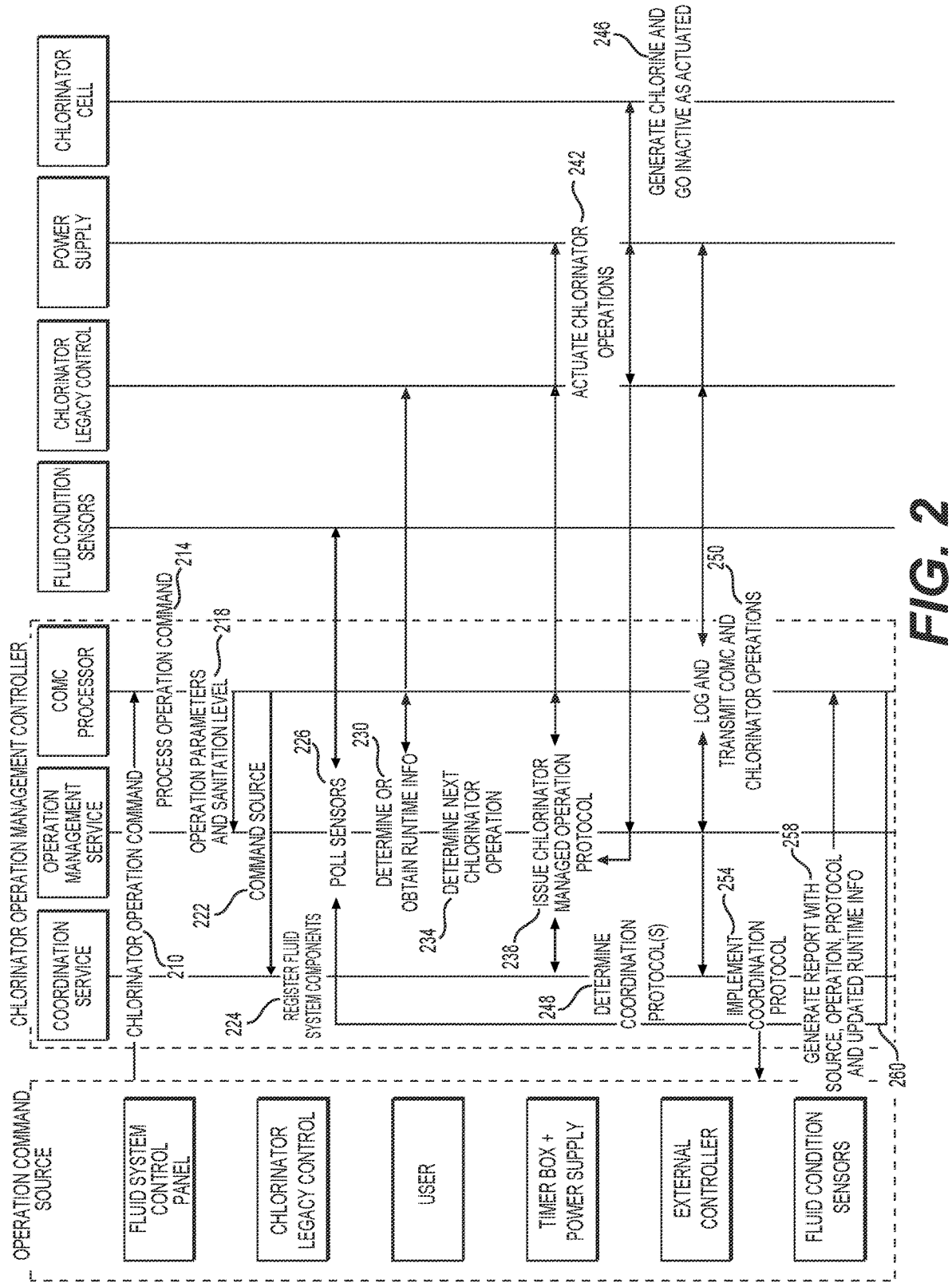
FIG. 2 is a sequence diagram of an example method for managing operations of a chlorinator and coordinating operations of fluid system components.

FIG. 2 is a sequence diagram of an example method for managing operations of a chlorinator and coordinating operations of fluid system components.

Exemplary management controllers according to the present disclosure generally may be configured to perform a method required for realizing a closed-loop control system that dynamically controls chlorine generation based on real-time demand for Free Chlorine. In one example, exemplary management controllers according to the present system may embody or otherwise realize such a closed-loop control system within a fluid system including a chlorinator by interrupting power and/or communication to the chlorinator. Thus, these management controllers may be installed in fluid systems to directly or indirectly take control of, but not to replace, chlorinators installed in the fluid systems. More generally speaking, a management controller according to the present disclosure may control an actuation of a chlorinator to be in an active state of generating chlorine and a termination of the same. In addition, management controllers described herein may be configured to subordinate or otherwise override other control schemes for causing chlorinator active-state actuation and termination that may be carried out locally on, or remotely from, a chlorinator.

At stage 210, a chlorinator operation management controller may receive an operation command via a respective processor ("COMC processor") from an operation command source.

In one example, the operation command source from stage 210 may include a type of FSC panel, for example a pool and spa control panel, frequently installed in fluid systems, such as pools and spas, to initiate, monitor, and control functions of equipment generally responsible for, or encompassing of, overall fluid system operations (e.g., pumps, filters, etc.). In this respect, FSC panels are often used to coordinate operations of various or groups of various equipment, such as lights or water features (e.g., bubblers, waterfalls, etc.), according to various pre-determined operation schemes recognized as options by the FSC panel. To do this, FSC panels may incorporate high voltage relays (known within the art and sometimes referred to herein as "control points," or auxiliary outputs, relays, or connections) that can be independently controlled by the FSC panel. Many FSC panels are configured to communicate and be operationally involved with legacy controls for chlorinators.

As noted above and as shown in FIG. 2, an operation command source may include an FSC panel, a legacy control, a user, a timer box and power supply, an external controller, or fluid condition sensors. In one example, the operation command source may include an FSC panel that directs operations of other components of the fluid system such as pumps, valves, and certain water features. However, to manage and direct operations of a chlorinator to dynamically meet fluid system chlorine demand in real-time, the management controller does not need such an FSC panel to be a component of a fluid system. As discussed below, exemplary management controllers according to the present disclosure may be implemented with other types of operation command sources and dynamically operate a chlorinator to optimize usage of total runtime and maximize service life.

In stage 214, the COMC processor for the management controller may process the operation command. In one example, the processor may identify the operation command source or type of source originating the operation command. In addition, the processor may extract operation parameters and a sanitation level associated with the operation command in stage 214. The operation parameters may include the specific times, durations, and/or cycle percentages for which the chlorinator will be active with respect to generating chlorine. In one example, this includes periods in which an electrical potential applied across the chlorinator blades causes electrolysis with the dissolved salt in the fluid flowing past the blades. In another example, the operation command may include, and the processor may extract or otherwise identify, a total number of cycles and a percentage of each of which the chlorinator is to generate chlorine.

At stage 218, the operation parameters and corresponding sanitation level may be conveyed to an operation management service. On the other hand, data that represents an identification of the operation command source may be conveyed by the processor to a coordination service in stage 222.

In one example, in stage 218, the operation management service may determine whether a new sanitation level is specified in the operation command upon receiving the operation parameters and sanitation level. More particularly, the operation management service may review the sanitation level associated with the operation command to determine if a new required chlorine level has been specified. In one example, in the case of a new sanitation level, the operation management service may communicate this new required chlorine level to the COMC processor for recording and/or transmission to a backend or user interface.

In stage 224, the coordination service can register fluid system components in response to receiving the command source information in stage 222. In one example, the coordination service can identify and process device information for, if present, a fluid system control panel, timer box, legacy control, external controller, fluid condition sensors, and/or the chlorinator in stage 224. This can include requesting, receiving, and reading responses from various system components and/or a backend that has been provided with manufacturer, model number, serial number, and device type information by the coordination service.

At stage 226, the operation management service may access detected values for parameters measured by fluid condition sensors included in the fluid system. In one example, the fluid condition sensors include at least a pH, ORP, and temperature sensor. In another example, a flow sensor may be provided by the chlorinator and a separate flow sensor may be installed upstream of the chlorinator and downstream of a fluid supply (e.g., a pump). Alternatively, there may only be a single flow sensor and it may be provided by the chlorinator. In still another example, the fluid conditions sensors polled by the management controller may include sensors for measuring all or some combination of salinity, alkalinity, dissolved oxygen, water hardness, nitrates, calcium, and the like.

A discussion of the relationships between pH, ORP, and temperature follows.

As is known in the art, ORP may be characterized as a rate of electron transfer between measuring components, for example a first electrode and a second reference electrode and is measured in millivolts (mV). Further, ORP corresponds to a ratio of Hypochlorous Acid (HOCl) to Hypocholrite Ion (OCP) in a chemical substance. HOCl is an oxidizer. Oxidation is the loss of electrons by and atom, molecule, or ion. A higher ratio of HOCl to OCP (i.e., higher ORP) corresponds to higher levels of HOCl (also referred to as Real Free Chlorine) and higher oxidation potential—an increased ability to cause elections (e−) to be transferred from an oxidant. As related to chlorine in a fluid system according to the present disclosure, a higher level of oxidation potential indicates that the chlorine is sanitizing fluid in the system effectively and efficiently.

A ratio of HOCl to OCP is inversely proportional to a pH level. Thus, a first fluid that includes chlorine and has a first pH that is lower than a second pH of a second fluid, is likely to have a higher level of HOCl than that of the second fluid. In turn an ORP of the first fluid is also likely to be higher than an ORP of the second fluid.

Temperature is also inversely proportional to pH. More specifically, a rise in the temperature of a fluid (e.g., water—$H_2O$) may result in the formation of hydrogen and hydroxide ions which lower the pH of the fluid.

In stage 230, the operation management service may determine runtime information for the chlorinator. More specifically, the operation management service can access, via the COMC processor, a log or other type of record maintained in a memory of the COMC or a COMC backend to obtain total, used, and remaining runtime values for the chlorinator, or more particularly, for the chlorinator cell. In practice, stage 230 involves determining the most accurate estimate of how much of a total runtime for a chlorinator cell has been used/consumed. This requires knowing a total runtime attributable to the cell when it was installed and a used runtime—the amount of time the cell has been active (used to generate chlorine) since installation.

In one example, the operation management service may access a legacy control for the chlorinator in stage 230 to determine if the chlorinator is currently active and if a used runtime logged by the COMC requires updating. In a case where the chlorinator is active, the operation management service can determine if the update should be a one-time update or involve continuous updating until it is determined in stage 234 what will be a next operation the chlorinator performs/is actuated to perform.

By knowing the used runtime, the management controller can determine the remaining runtime as the amount of the total runtime minus the (current) used runtime. One advantage of the systems and methods described herein is that a management controller is configured to determine, continuously, an accurate up-to-date remaining runtime for a chlorinator on a real-time basis. In turn, this allows the management controller to dynamically adjust when and how much chlorine is generated in response to changing conditions and as a function of a chlorine level specified by a current sanitation level setting for the fluid system.

At stage 234, the operation management service may determine a next operation for a chlorinator based on any or all of the operation command received in stage 210, the required sanitation level, the runtime information, and the fluid flow conditions. As discussed in more detail with reference to FIGS. 3-7, a management controller according to the present disclosure is configured to manage chlorinator operations based on characteristics of an overall operation of a fluid system processed in real-time.

An overarching determination made in stage 234 by the operation management service is whether to override the operation command received in stage 210, at least with respect to a chlorinator. Along this line, stage 234 may include evaluating an efficiency of continuing to operate a chlorinator under a dynamic control versus just implementing the operation command from stage 210. The management controller may implement the operation command instead of overriding it with dynamic operations described herein, based on different fluid conditions and comparisons between respective runtimes and/or resource utilization levels. In some examples, whether the management controller makes these inquiries may depend on if values for certain fluid conditions (e.g., temperature, pH, flow rate at chlorinator, etc.) are within specified ranges and/or whether operating the chlorinator pursuant to the operation command will maintain a current required sanitation level.

For example, where a command runtime is sufficient to maintain the current required sanitation level. The management controller may project and compare a runtime that will be required for the operation command and a runtime that may be expended under dynamic control. At least initially the operation command received in stage 210 may be implemented where the runtime associated therewith is less than a runtime that the management controller projects will be expended through dynamic control over the time-period specified by the operation command. This may occur in a situation where the command, now current, sanitation level specifies a lower chlorine level than a chlorine level specified in the previous required sanitation level.

Even if an operation command is initially implemented based on the above-described evaluation, except in certain circumstances described below, the management controller may continuously analyze fluid conditions and modify operation control schemes as needed. More specifically, the management controller will continuously evaluate whether the control scheme associated with the operation command optimizes usage of the chlorinator's total runtime based on current demand of Free Chlorine. As described herein, current demand of Free Chlorine is a function of continuously detected current chlorine level relative to a required sanitation level as recognized by the management controller when the current chlorine level is detected.

More often than not, the dynamic control will result in less runtime for the chlorinator but operating according to the operation command may have other benefits, such as a reduced processing load on the management controller over a certain period of time.

In other situations, the management controller may determine that a measured value for a monitored flow condition indicates that dynamic control of chlorinator operation/chlorine generation will be unnecessary or inefficient. More specifically, in one example, the management controller may be configured to recognize that a factor affecting the flow condition in question must be prioritized for an overall required sanitation level to be obtained for a fluid system. Thus, changing an operation state of the chlorinator may not be an option and doesn't need to be re-evaluated under a dynamic control scheme. In another example, the management controller may recognize that an effect a current operating state of chlorinator has on a current chlorine level or chlorine demand does not need to be evaluated until the value for the subject flow condition is within: (A) a predetermined range; or (B) some standard of deviation from one of the limits of the range. In this example, the management controller may determine that the chlorinator is going to be required to be in an active or an inactive state, either pursuant to or opposite from the operation command, for a prolonged but potentially indeterminate amount of time, because the need for a chlorine demand-based operating change will not manifest until the value of the flow condition is within the predetermined range or near a range limit. One such example is described in more detail with reference to FIG. 3.

In stage 238, the operation management service may issue a managed operation protocol. In one example, the operation protocol may be issued to the coordination service and the legacy control. Issuance to the legacy control results in an actuation, directing, and management of chlorinator operations in stages 242 and 246. The management controller may control, according to the managed operation protocol and through the legacy control, scheduled application(s) of power that actuate and terminate active states of the chlorinator cell. In one example, the management controller may be incorporated into a connector that screws into, or is otherwise physically connected to, a unit that includes: the chlorinator cell; or the chlorinator cell and the legacy control; or the legacy control and the power supply.

In any of the above examples, the managed operation protocol includes a communication signal(s) (e.g., RS 485) that adheres to a communication protocol of the legacy control and is configured to control operations of the legacy control in stage 238. In another example, managed operation protocol may carry the communication signal (e.g., RS 485) and a power signal (e.g., 120V) from the power supply to the legacy control. In one example, the management controller may issue the managed operation protocol that carries a power signal on a temporal basis matching that of a communication signal that triggers a maximum run setting for the legacy control (100% on). Thus, the management controller can make the chlorinator cell go active (100% on) as part of stages 242 and 246 as a function of permitting the power signal to be transmitted to the legacy control. This effectively allows the management controller to pseudo-directly operate and actuate the active state of the chlorinator cell.

Stage 238 may additionally include the operation management service issuing the managed operation protocol to the COMC processor and the coordination service. In one example, the managed operation protocol may include instructions for the COMC processor to access the legacy control, fluid sensors, and the power supply to record operations, fluid conditions and the like. Further, the managed operation protocol may be received by the coordination service and used to determine what communications are necessary between the management controller and the operation command source, a user interface, and other fluid system components.

At stage 242, as discussed above, by receiving the managed operation protocol, the legacy control and the power supply may be caused to implement processes that actuate the chlorinator cell to generate chlorine and go inactive in stage 246. In one example, operation of the chlorinator cell in stage 246 may include the legacy control, carrying out the managed operation control protocol, supplying and interrupting the supply of power to the chlorinator cell. Further with respect to stage 242, the managed operation protocol may specify, and the legacy control may carry out, a feedback loop with the operation management service. In one example, the feedback loop may include the legacy control continuously communicating or allowing the operation management service to access information about current operations the legacy control is performing and values of any fluid conditions monitored by sensors for the chlorinator (e.g., salinity, flow, etc.).

As stages 242 and 246 are performed, the coordination service determines the coordination protocol in stage 248, and the COMC processor continues to monitor and log the operations of the legacy control, power supply, and chlorinator cell in stage 250.

The management controller can be configured to communicate according to the communication protocols of a legacy control for the chlorinator, and an FSC panel or an external control, or an FSC panel, or other device. Stage 248 can include the coordination service selecting protocols from a database based on matching the operation command source and/or chlorinator with information stored in the database for those particular models and/or individual units. In one example, prior to installation of the management controller, an external control or FSC panel may have been able to initiate pre-set operations by a legacy control, and thus a chlorinator. However, once installed, the management controller will be responsible for directing the operations of the chlorinator through the legacy control, without being limited to the pre-set operation schemes of the legacy control. At the same time, the management controller will communicate (e.g., provide requested conditions such as salt and temperature) via the coordination service, with an external controller or FSC panel or other operation command source as needed to ensure that no error is generated with respect to the chlorinator. Therefore, stage 248 can include the coordination service determining what communications are expected by the operation command source as well as generating and queuing those communications.

At least with respect to the FSC panel, the coordination service of the management controller operates to provide the FSC panel as much information as required for the FSC panel to move to another device it controls in a performance monitoring mode. In addition, the coordination service may be configured to ensure that operations of other devices controlled by the FSC panel are not affected (e.g., cause a shut down by the FSC panel). In practice, when the FSC panel polls for salinity or temperature from the legacy control, the coordination service may respond in stage 248 or 254 with values for those fluid conditions according to the protocol determined in stage 248.

At stage 254 which follows, the coordination service may implement the coordination protocol determined in stage 248.

The method of FIG. 2 can be summarized generally as a management controller receiving in stage 210, a command intended for the chlorinator (i.e., legacy control) which originated from or was otherwise transmitted because of the operation command source performing an operation. Then, the management controller basically interprets operation commands in stage 214. Because the management controller is basically taking over the control of the chlorinator from the operation command source, the management controller must regularly monitor the fluid conditions in stages 226 to 248. Stage 248 then involves the coordination service of the management controller determining what portions of the operation command the management controller needs to retain and/or address by sending data to the operation command source. Stage 254 then may include the management controller transmitting information and commands determined necessary in stage 248 to specific destinations also identified in stage 248.

The management controller may simulate a connected chlorinator in stage 254 to an FSC panel provided as the operation command source. In this mode, except for active or inactive status, in stage 248 or 254, the coordination service may copy, without modification, information from the chlorinator that was requested by the FSC panel in stage 210. With respect to status, since the chlorinator is going from active to inactive based on actual chlorine demand, there will be times where an actual status of the chlorinator is different than what would be expected by the FSC panel. However, in stage 248, the management controller, having processed the operation command from the FSC panel, may produce a signal representative of a chlorinator status expected by the FSC panel according to a time it is provided to the FSC panel and a schedule of chlorinator operations represented by the operation command. Thus, the coordination service may respond to the FSC panel in stage 254 with: (1) information copied from a chlorinator such as a salt reading, a flow state, and a model number from the chlorinator; and (2) information generated by/originating from the management controller which reflects a chlorinator status expected by the FSC panel based on the operation command.

In some examples, implementation of the coordination protocol in stage 254 may include discontinuing a power supply to the management controller when an FSC panel or wall timer (operation command source) disconnects power to the chlorinator. In this situation, a remote server provided as part of the COMC backend may have the ability to differentiate between a scheduled power off and an issue with a power connection at the management controller. Further, the coordination service may not reply to the FSC panel with any data if the chlorinator is not plugged-in order to simulate the chlorinator not being plugged in to the FSC panel directly.

In another example, stage 254 may include the coordination service communicating operation errors of the chlorinator and fluid system alerts (e.g., low and critical low salt, high salt, cold cell, dirty cell, system errors, high current errors, low voltage errors, integrated circuit (IC) board temperature, and other diagnostic temperatures) to a user via an interface (mobile application, web application, etc.) presented on a computing device. In one example, the management controller, provided with a current flow rate and/or a schedule of pump operations, may determine in stage 248 and alert a user in stage 254 to a situation in which a current duration of pump operation is not sufficient to sanitize a fluid system such as a pool or spa. In another example, the management controller may receive salt information from a chlorinator in stage 226, use a prestored gallon size of the pool to calculate an amount of salt to be added in stage 248, and in stage 254, alert a user of pool salt level being low.

Along the lines of alerting users to error conditions, the management controller may issue alerts based on recognized patterns of operation. The management controller can work with a COMC backend to ensure that historical sensor information is stored, accessible for analysis, and used as a benchmark for evaluating current operations. In one example, again in the context of a pool and spa defining or otherwise including a fluid system, the management controller can track temperature and an on/off status for devices other than the chlorinator. For example, in stage 254, the management controller can request the on/off status of a heater from an FSC panel provided as an operation command source. The management controller can recognize from the historical data that a pool's temperature is slightly elevated when a spa is running and a heater, which may be triggered independently from a spa operation, is operating. The management controller may recognize through various iterations of the method of FIG. 2, that an elevated temperature has been detected during stage 226 over a prolonged period of time relative to the time of a last spa operation.

In a subsequent iteration of stage 254, the management controller may alert a user to check an operating status of a heater which the user may have forgot to turn off. Accordingly, instead the heater running for days and consuming gallons of gas, the user is sent an alert because of the method of FIG. 2 which caused the user to check, and turn off, the heater after only a few hours of unnecessary use and gas consumption. In addition, the management controller may be configured to perform this type of derivative analysis of component data for chlorine level determinations to alert users to conditions not necessarily related to chlorine level or demand.

In addition to storing historical data, a COMC backend can serve a network of management controllers and make data available to remote users via a mobile application, web application, or other software product. The historical data can include periods when the chlorinator was active, and the used and remaining runtimes at the beginnings and ends of those periods as reported with iterations of stage 254. Accordingly, in the context of pools and spas, an individual pool owner may be able to access information regarding the chlorinator for their pool, and/or a pool technician may be able to access runtime information for several chlorinators installed at different pools the technician services.

Another feature of the methods and systems described herein is an ability to track and store data representing chlorinator operations even when a management controller is not controlling chlorinator operations. Again, in the context of pools and spas, a pool owner could use this feature to see if the dynamic control of the management controller was better for chlorinator runtime than a legacy control scheme and schedule of operation. The pool owner can utilize the track-only mode for the management controller and see how much runtime was used during a first month under the legacy control scheme. For a second month, which may be the month following the first month or the same month in a following year, the pool owner can have the management controller direct chlorinator operations based on a required chlorine level (e.g., 1.5 ppm) and obtain a total runtime for comparison with the runtime from the previous month. Assuming the runtime for the second month is less than the first month, the management controller may be able to project how much chlorinator runtime may be saved over an extended period of time.

In stage 258, the coordination service may generate and transmit to the COMC processor, a report including summary information for the operation command source, the operation command, the implemented coordination protocol, and updated runtime information. Based on the report or information logged in stage 250, the COMC processor may perform a feedback loop in stage 260 and iteratively perform, inter alia, polling of the fluid condition sensors in stage 226, determining chlorine demand in stage 234, and issuing an operation protocol in stage 238 and thereby implement dynamic control.

Figure 3:
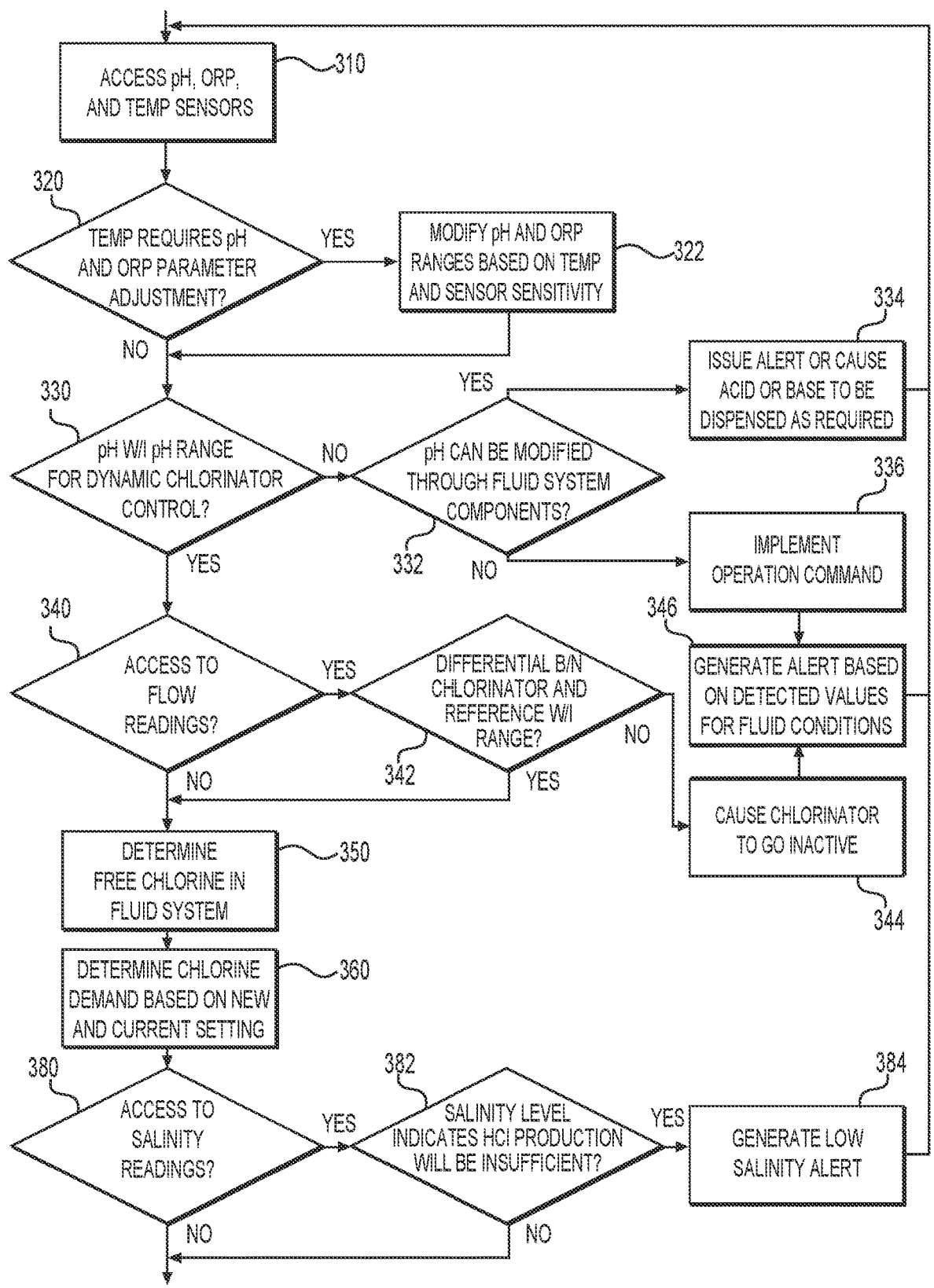
FIG. 3 is an algorithmic flowchart illustrating an exemplary method for determining fluid conditions for a fluid system including a chlorinator.

FIG. 3 is an algorithmic flowchart illustrating an exemplary method for determining or otherwise accessing values for fluid conditions detected by fluid condition sensors. In stage 310, readings for pH, ORP, and temperature detected by fluid condition sensors may be accessed by a management controller and/or a COMC backend as described herein. Each of these sensors may be installed in a fluid system at or upstream of a chlorinator. The ph and ORP sensors may include probes as is known in the art. Other types of pH and OPR sensors may be utilized.

At stage 320, the measured temperature can be referenced to determine correction factors or used for evaluating and reading detected pH and ORP values need to be adjusted in stage 322. In one example, ranges used as a basis for determining compliance with a required sanitation level may be adjusted. For example, based on a measured temperature, a management controller may reduce an expected ORP demand for a fluid system. With respect to reading or interpreting values detected by the pH and ORP sensors, a management controller, for example, may use temperature from a chlorinator to adjust the pH and ORP values due to sensor variation caused by temperature.

In stage 322, any adjustment to parameters associated with the pH and ORP sensors may be carried out. In one example, a management controller can communicate with the sensors so that the sensors apply a correction factor before reporting or allowing access to detected values. In another example, the management controller can apply a correction factor to values it receives from the pH and ORP sensors based on a detected temperature.

At stage 330, a management controller may access a pH sensor to obtain a current pH level for fluid flowing through a fluid system. In one example, the management controller may compare the current pH level to a range and determine if dynamic control of the chlorinator is appropriate. For example, where the pH is not within a range of 6.8 to 8.0, may not revert to dynamically control the chlorinator because the fluid system requires an extended period of: (A) no chlorine generation in some situations; or (B) uninterrupted chlorine generation in other situations.

In stage 332, where the pH level is outside predefined range, as determined in stage 330, the management controller can communicate with various components of the fluid system including the chlorinator, to determine if the fluid system includes components that can be operated to modify the pH level of the fluid. It may be the case that one manner of uninterrupted operation of the chlorinator previously mentioned may be sufficient to directly address the pH issue. In other situations, such uninterrupted operation may need to be coupled with another process or component operation to bring the pH level within the range.

In some examples, the management controller may be authorized or otherwise configured to operate, or more generally cause to operate, a fluid system component that dispenses a base or acid material. In other examples, the management controller may directly or indirectly communicate with the pH-modifying fluid system component and provide information that is used to assist controlled operations of that component. In still other examples, the management controller may only have access to information that informs such a pH-modifying component is installed in the fluid system.

Where the answer to the inquiry in stage 332 is affirmative, in stage 334, the management controller can cause or transmit information that may cause acid or base to be dispensed and the pH level to be changed. Thus, in some examples, the management controller may be able to communicate with or power an acid dispensing system to lower the PH if required. In other examples, the management controller may instead, or additionally, be able to communicate with or power a base dispensing system (e.g., soda ash) to increase the pH if required. In addition to these capabilities, the management controller may also issue an alert in stage 334 that may result in pH level altering operations.

In one example, even if the management controller has no authorization to control, or communicate with, or communicate to any other component about a pH modifying component, the management controller may be authorized to issue an alert in stage 334 that is specific to the pH modifying component. The alert may inform a user what operation may be required therefrom or how much chemical must be dispensed.

In the event the management controller is not set up for any of these activities the management controller can implement, or permit the legacy control to implement, the operation command in stage 336. In addition, the management controller can generate an alert in stage 344 that may advise: (A) what the operation command was; (B) the chlorinator is operating per the operation command; (C) what the last pH reading was; and (D) how much the current pH level deviates from an acceptable range for dynamic control by the management controller.

In stage 340, the management controller may exercise any access it has to measured fluid flow rates in stage 340. In particular, the management controller may communicate with a legacy control for a chlorinator to determine if a flow has been detected by the legacy control. In another example, a fluid system may include a flow rate sensor upstream of the chlorinator which also has an ability to detect a presence for fluid flow therein.

At stage 342, based on the flow rate information that is available, the management controller can evaluate whether a differential between a chlorinator flow rate and a reference flow rate is within a predetermined range. In fluid systems including a single flow rate sensor this amount to checking to see if a detected flow rate has a non-zero value (i.e., flow is present). In other examples, the detected flow rate may be compared to minimum and/or maximum threshold flow rates to determine if the fluid system is operating properly.

In fluid systems with multiple flow rate sensors, as discussed above, a differential between the measured flow rates can be compared to a bounded range to determine if a stop operation condition persists. More specifically, by comparing the differential between the flow rate in the chlorinator and a point upstream (and/or downstream) of the chlorinator, the management controller can identify a situation for which chlorine production is unsafe. Namely, an obstruction between the upstream sensor and the chlorinator that causes little or no fluid to flow to the chlorinator while in an active state can result in the chlorinator cell being used up or damaged to the degree of being unusable.

In the event the flow rate differential is not within a specified range, an alert may be generated in stage 344. The alert may advise what the last flow rate differential was and/or how much the current differential deviates from an acceptable range.

The management controller may determine a level of Free Chlorine for the fluid in stage 350 where the management controller determines: (1) no flow rate information is available in stage 340; or (2) accessed flow rate information indicates a fluid flow is acceptable in stage 342. The management controller can access pH and ORP levels and calculate an amount of Free Chlorine according to methods known in the art in stage 350. More specifically, the management controller, configured to apply the relationship between pH and ORP previously discussed, may determine a level of Free Chlorine.

At stage 360, the management controller can determine current (a) required and (b) command chlorine demand levels based on the chlorine level determined in stage 350. In one example, stage 360 can include evaluating a sanitation level associated with the operation command (if different than a prior established required sanitation level) and extracting a command chlorine level therefrom. In addition, stage 360 may include determining a command chlorine demand and a current chlorine demand where the command chlorine level differs from the chlorine level of the current required sanitation level. Otherwise, only the current chlorine demand will be determined.

In one example, the chlorine demand may be determined by using the measured values for pH, temperature, and ORP to regulate the chlorine demand so that the ORP value remains within a predetermined range. In one example, the regulation of the chlorine demand may be based on maintaining an ORP above 650 mV and below 750 mV. Since an estimation of Free Chlorine from an ORP value for a fluid is affected by the pH of the fluid, in stage 360, the management controller can use the pH value from stage 310 to refine a calculation of chlorine demand so that if met, the ORP will fall within the predetermined range.

In stage 380, a check for access to salinity information can be made. In one example, the chlorinator may be capable of determining salinity (i.e., amount of dissolved salt in a fluid) of the fluid flowing through it. In another example, a salinity probe may be installed in the fluid system upstream of the chlorinator. In the event that a salinity reading is not available, the management controller may conclude an iteration of polling flow conditions sensors. Otherwise, the management controller may derive the chlorinator's current capacity to generate chlorine according to a detected salinity and compare that capability to at least the current chlorine demand determined in stage 360.

The management controller may evaluate a current salinity level in stage 382 to determine a capacity of the chlorinator (chlorinator cell) to generate chlorine relative to both a command and a current chlorine demand where both have been calculated or otherwise determined in stage 360. Where the evaluation in stage 382 of the measurement of the salinity level indicates there is not enough dissolved salt in the fluid for the chlorinator to generate enough Free Chlorine to meet the current chlorine demand (and/or the command chlorine demand if calculated), the management controller may issue an alert to that effect in stage 384. Otherwise, the management controller can progress from a current iteration of checking flow condition sensors. On the other hand, if the management controller causes acid or a base to be dispensed or issues an alert in stages 334, 344, or 384, a new iteration of checking flow conditions may begin by accessing the pH, ORP, and temperature sensors in stage 310.

It will be understood that stage 226 described above may include execution of some or all stages of the exemplary method of FIG. 3.

Figure 4:
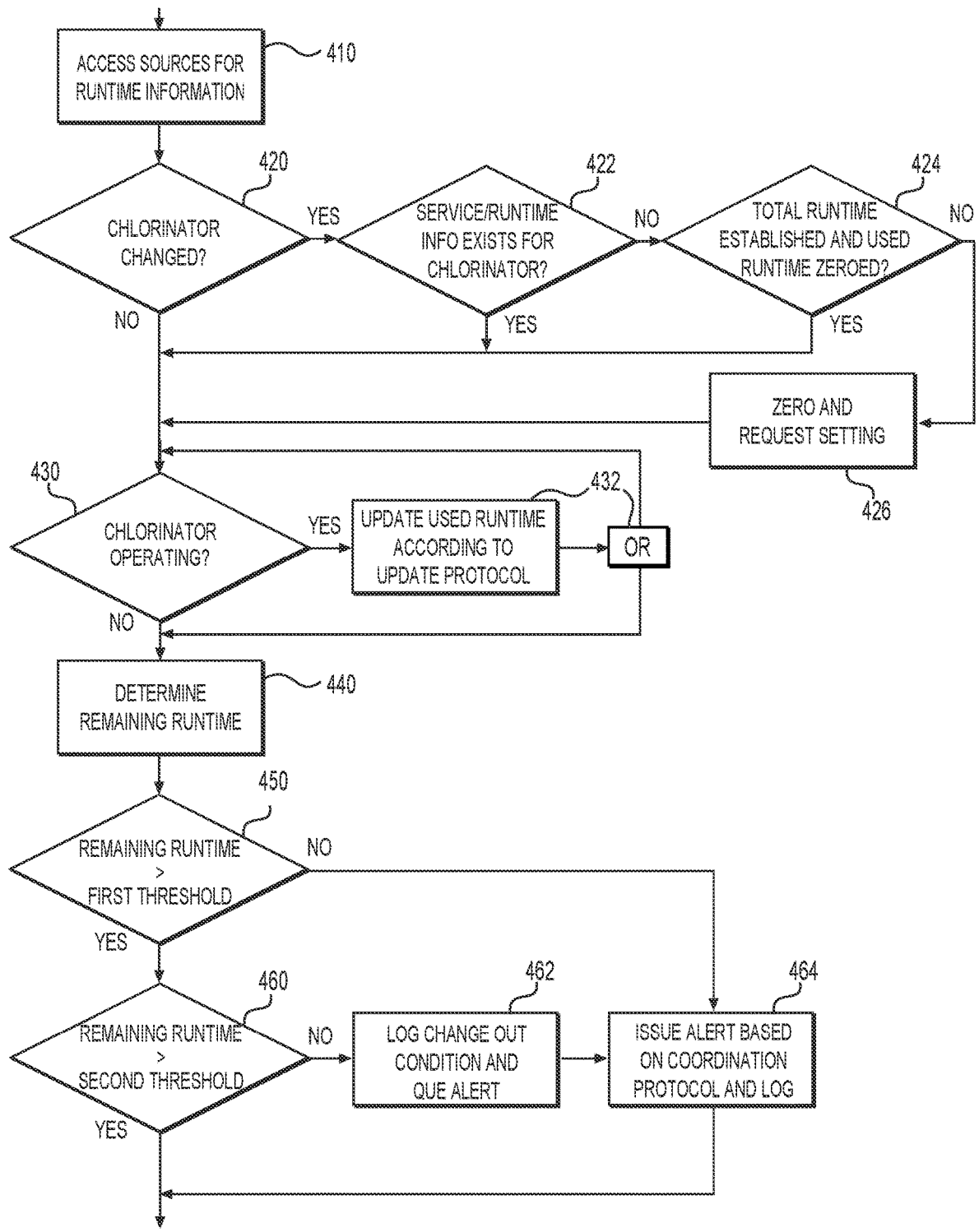
FIG. 4 is an algorithmic flowchart illustrating an exemplary method for determining a remaining runtime for a chlorinator.

FIG. 4 is an algorithmic flowchart illustrating an exemplary method for determining a remaining runtime for a chlorinator.

In stage 410, chlorinator runtime information, recorded in a log, database, or other data package stored in a memory storage, may be accessed. In one example, the accessed runtime information may include a total runtime and the last used and remaining runtimes. In one example, a global runtime log may be maintained by the management controller and/or a COMC backend. According to one example, fluid systems, chlorinators (both with and without a legacy control packaged with a chlorinator cell), as well as chlorinator cells can be assigned identifiers by the management controller/COMC backend. The identifiers can be utilized to index chlorinators with respect to fluid systems, and/or cells with respect to chlorinators and fluid systems, and used to look up and update runtimes and service life records.

In one example, a database that tracks runtimes and service life records may be stored in a memory of the management controller. In examples where the management controller is supported by a COMC backend, the database can be periodically backed up and stored on the COMC backend. Every time a chlorinator/chlorinator cell is taken out of or put in service, the COMC backend or management controller can record the change in a runtime log.

In another example, the memory for the management controller can function as a cache for the COMC backend and a chlorinator or a cell for a chlorinator that is currently in service within a fluid system. In particular, the management controller can store runtime information for the chlorinator (or just the chlorinator cell) as long as the chlorinator or cell is in service (e.g., installed, capable of being actuated, can be connected to a power supply) in that fluid system. If taken out of service (e.g., replaced or taken offline), the management controller can permanently record identifiers, install dates, and removal dates for the chlorinator or chlorinator cell in a list the management controller maintains. All runtime information stored by the management controller for that chlorinator or cell can be deleted upon being successful transfer to the COMC backend along with a copy of the information permanently recorded. In this example, a cleared memory can serve as a flag the management controller recognizes in stage 420 as indicating there has been a change of the chlorinator/chlorinator cell since the last chlorinator operation.

At stage 420, the management controller can determine if a chlorinator has changed since a last chlorinator operation in which runtime information for a currently installed chlorinator or chlorinator cell was at least accessed. In one example, the management controller can access a log for the fluid system in question which the controller maintains locally or a log maintained by the management controller or a COMC backend. In another example, the chlorinator may include some type of computing device consisting of a processor and memory storage that can hold onto service and runtime records specific to the chlorinator, and which can be accessed, updated, and retrieved by the management controller. In one example, these stores of information may back up data components of a global fluid system log that includes current and historical records for chlorinators installed in the fluid system.

The management controller can access one or all the sources of information described above and determine that the chlorinator was changed. More specifically, the management controller can find information specific to the fluid system that documents the change. In another example, the management controller can recognize that its local storage, which is used to continuously update runtimes for on-going chlorinator operations, has been cleared. In another example, the management controller may determine from a review of accessible information sources that no identifier has been assigned or that there are no records at all for the chlorinator or chlorinator cell. In any of these scenarios, the management controller can determine there was a chlorinator change, make a record of the change with respect to an identifier of the current chlorinator and the previous chlorinator, and move on to stage 422 to evaluate any service or runtime information for the current chlorinator.

If service and runtime information associated with the chlorinator (or chlorinator cell) is not accessed in stage 422, the management controller can check to see if a total runtime has been established and used runtime is zeroed in the appropriate log in stage 424. If either of these conditions is not met, the management controller can zero the used runtime and issue an alert requesting a setting for the total runtime in stage 426. In one example, the alert/request can be transmitted to the COMC backend which can look up specifications for the chlorinator if it has a record of type, manufacturer, and/or model information for the chlorinator. In another example, the alert/request can be issued to a user interface to be addressed by an operator or other fluid system user.

At stage 430, where the chlorinator is currently generating chlorine, the used runtime recorded for the chlorinator can be updated according to an update protocol for the fluid system. In one example (down return arrow), the update protocol may specify that the used runtime is updated by adding an amount of tracked operating time since a most recent time the used runtime was updated and determine the remaining runtime in stage 440. Under this protocol, whether the chlorinator continues to operate does not perpetually determine when stage 440 is performed. In another example (upward return arrow), the update protocol is set so that the used runtime is updated continuously until the chlorinator stops operating and then the remaining runtime is determined in stage 440.

At stage 440, an updated remaining runtime for the chlorinator (or chlorinator cell) is determined based on the total runtime and the updated runtime determined in stage 432. The updated remaining runtime corresponds to the remaining amount of time that the chlorinator can generate chlorine. This is not to be confused with service life which may be a quantity of time established by a manufacturer for setting a warranty period. In another example, the service life corresponds to an amount of time after the chlorinator is either manufactured or generates chlorine for the first time for which a rate of output (amount of chlorine generated) per unit of operating time is above a certain level.

In stage 450, the updated remaining runtime can be compared to a first threshold. Where the remaining runtime is greater than the first threshold a comparison to a second threshold can be performed in stage 460. Otherwise, an alert may be issued in stage 464 where the remaining runtime is less than the first threshold. In one example, the first threshold can correspond to an operating time associated with an operation command currently being processed by the management controller. In another example, the first threshold can correspond to a projected operating time for a current dynamic control operation.

The second threshold can be greater than the first threshold and correspond to a minimum amount of runtime that a used chlorinator should have if it was being put back into service after a scheduled period of non-operation (e.g., as part of a winterization procedure). Thus, if a winterization procedure is imminent, the management controller can effectively evaluate if once the current chlorinator is taken out of service it should be put back into service or replaced once a winterization period is over. Accordingly, where the remaining runtime is less than the second threshold the management controller can log a change out condition in a respective storage memory and/or with a COMC backend in stage 462. In addition, an alert for the change out condition can be queued in stage 462 and issued in stage 464 based on a current coordination protocol.

It will be understood that stage 230 described above may include executing or performing some or all stages of the exemplary method of FIG. 4.

Figure 5:
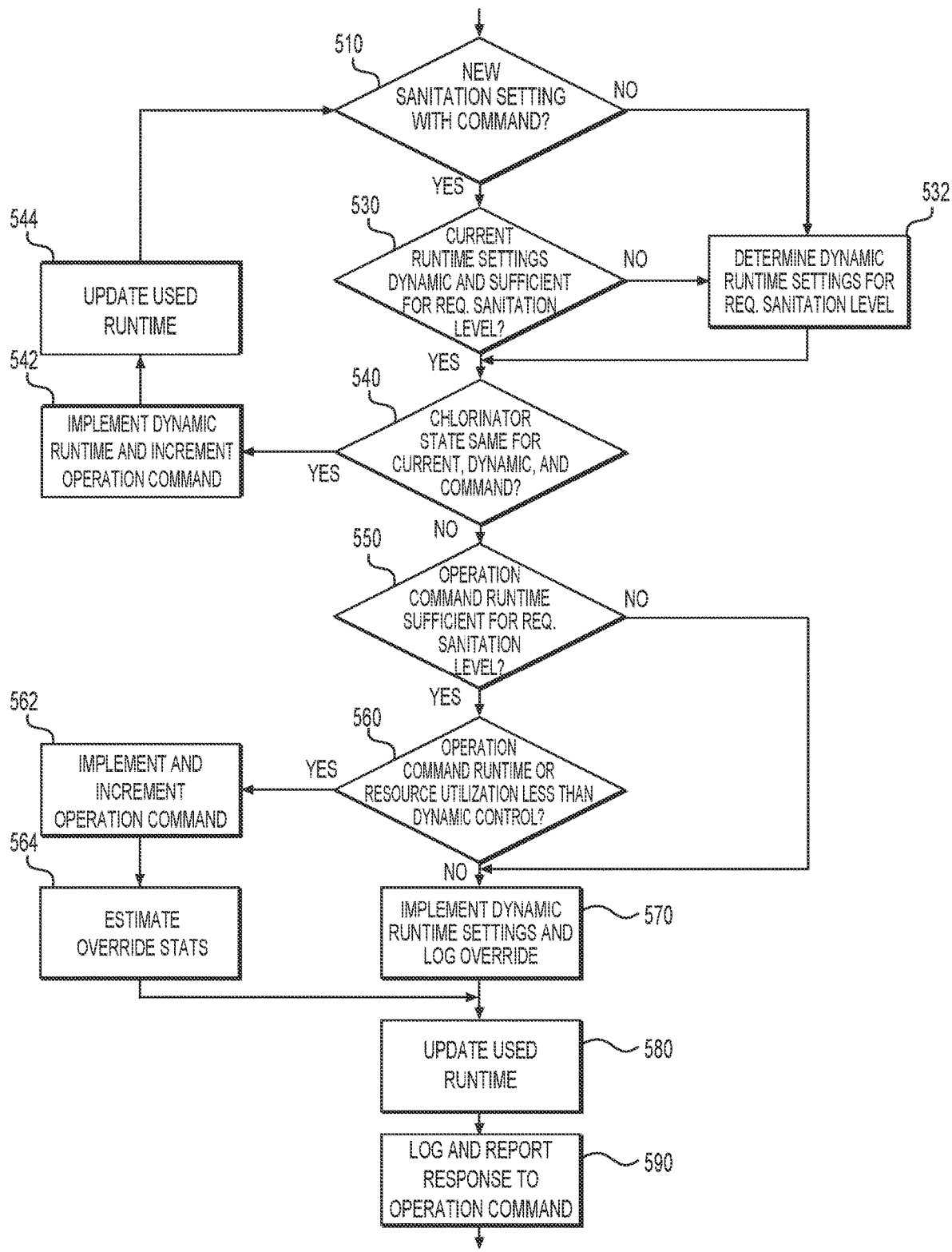
FIG. 5 is an algorithmic flowchart illustrating an exemplary method for managing operations of a chlorinator based on a required sanitation level and chlorinator runtime.

FIG. 5 is an algorithmic flowchart illustrating an exemplary method for managing operations of a chlorinator based on a required sanitation level and chlorinator runtime.

In stage 510, a management controller, utilizing a respective processor and algorithms implemented thereby, or through communications with a COMC backend, may determine a new setting for a sanitation level is specified in an operation command. Where a new sanitation level is specified, the management controller can establish the new sanitation level as a current required sanitation level for the fluid system in stage 510 and progress to stage 530. Otherwise, the management controller can determine a required runtime setting for the dynamic control scheme in stage 532, discussed in more detail below.

As described herein, a sanitation level can include a combination of parameters and threshold values or sub-settings for each of the parameters. A pH level, a range for a pH level, an ORP level, a range for an ORP level, a chlorine level, as well as limits for salinity, alkalinity, dissolved oxygen, water hardness, nitrates, calcium, and the like can be components of a sanitation level. Any time a new operation command is received, new limits or ranges for any these parameters may be specified. However, in stage 510, the primary parameters for evaluation may be those that relate to chlorine level such as pH, ORP, and temperature. More specifically, the operation command may be reviewed for a new sanitation level that includes or specifies a chlorine level that is different than a current chlorine level limit for the fluid system—either explicitly or as a byproduct of different limits/ranges for pH and ORP.

At stage 530, the management controller can evaluate whether a current runtime setting is being implemented under the dynamic control scheme, and sufficient for the new sanitation level established in stage 510 as the current required sanitation level. The current runtime setting could be an implementation of a previous operation command or the dynamic control scheme. In the case of the former, if the current runtime setting was specified in a previous operation command, even if it is sufficient for the new, now current, required sanitation level, the management controller must determine the dynamic runtime setting that will be required—at least for the purpose of comparison in stage 560 as described below. In the case of the latter, the management controller essentially determines if a dynamic runtime setting that was implemented on a real-time basis for a previous evaluation of chlorine levels, chlorine demands, and resource utilizations, can continue to be implemented. If it can't, meaning the second criteria for stage 530 is not satisfied, then a new dynamic runtime setting must be determined in stage 532.

In stage 532, the management controller may determine a required runtime setting under a dynamic control scheme that must be implemented to meet the current required sanitation level.

One advantage of the methods and systems described herein relates to when dynamic control results in no operation of the chlorinator—this means that a chlorine level in a fluid system is sufficient to meet a required sanitation level. Thus, generating chlorine under any control scheme is unnecessary based on the fluid conditions as detected. Aside from used and remaining runtime considerations discussed with respect to stages 550 and 560, this effectively converts the fluid condition sensors into the primary operation command source for the chlorinator. A result of the dependence on the fluid condition sensors is the dynamic control operation overriding an operation command where the chlorinator would unnecessarily generate chlorine.

In one example, the management controller can take the form of a connector that may be screwed into a chlorinator with a cable that connects to a connection point for the chlorinator cell. In this example, the management controller can directly communicate with or otherwise gather information from the chlorinator cell. With this and other configurations described herein, the management controller can make the chlorinator go into an active state of generating chlorine for 100% of any period of time, for example 15 minutes, and then operate the chlorinator to go into an inactive state in which chlorine is not generated. In this way, usage of a chlorinator cell's total runtime is optimized for times when additional chlorine is needed, and situations in which chlorine is needlessly introduced into a fluid system and portions of a total runtime for the chlorinator are expended without providing any benefit may be avoided.

At stage 540, the management controller can review a current state of the chlorinator relative to a respective state under the dynamic control scheme and a scheme for the operation command at the same point in time. If all states are the same (e.g., all specify that the chlorinator should be active or all specify it should be inactive), the management controller may implement the dynamic control scheme in stage 542 and update the used runtime for the chlorinator in stage 544. In addition, at stage 542, the management controller will increment or otherwise shift a point of reference in the runtime settings in the operation command to reflect an actual lapsation of time since a start time or a last time that stage 542 completed. In this way, a comparison in the next iteration of stage 540 will be between (1) an operation state dynamically determined in stage 532 based on chlorine demand, and (2) an operation state that reflects a temporal progression through an overall scheme of chlorinator operations specified by the operation command.

It should be noted that stages 540, 542, and 544 may be repeated as long as an operation state specified from stage 532 and one specified in the operation command are the same. Accordingly, the method of FIG. 5 minimizes an amount of processing that is required where an operation command is received and specified an operation state that the management controller would have implemented irrespective of receiving the operation command. Further, as discussed with respect to the method of FIG. 6, while the operation states match there is no override to report and coordination with the operation command source is simplified because a passthrough response can be issued.

At stage 550, with the required sanitation level established in stage 510, the management controller can determine if a runtime required to complete the operation command ("command runtime") will be sufficient to maintain or raise a current sanitation level at or to required sanitation level. Where there a determination that there is a chlorine demand, for example as in stage 360, the management controller can estimate by how much the chlorine level in the fluid system will increase, if at all, if the operation command is implemented. Alternatively, where a current chlorine level meets the requirements of the required sanitation level, the management controller may determine if implementing the runtime specified in the operation command will result in a chlorine demand.

In one example, command runtimes may be broken down and evaluated on a basis of cycles and total time as specified in the operation command. For example, the operation command specifies that the chlorinator will operation as 30% for the next 6 cycles, with each cycle extending for one hour. The management controller may evaluate the sanitation level and fluid system operative requirements for maintaining the sanitation level by cycle as well as over a total time associated with the operation command. In addition, the management controller may account for environmental factors when the operation command is evaluated for runtime sufficiency.

Regarding environmental factors, the management controller may be configured to recognize that a period associated with an operation command coincides with a period where sunlight and temperatures are typically at elevated levels. In another example, the management controller may have access to weather information (e.g., via the internet or through a connection with a CMOC backend) that indicates heavy rainfall is expected over the same time or portion of the time covered by the operation command. The management controller can be configured to adjust estimates for chlorine production required to maintain the required sanitation level at different times that coincide with a time period covered by the operation command. In addition, the management controller may be configured to determine how much chlorine will be generated and estimate a corresponding chlorine level for the fluid system resulting from an operation schedule and total runtime for the operation command.

In yet another example, exemplary management controllers according to the present disclosure may be configured to estimate a degree to which required chlorine production is likely to fluctuate over a time period covered by the operation command. Further, this estimate variability may be used by the management controller to evaluate the operation comment. For example, an operation command may cover a period(s) in which a fluid system will be exposed to daytime and nighttime levels of sunlight and temperatures. Chlorine production requires may therefore fluctuate along with levels of these environmental factors, whereas the operation command will specify a non-varying percentage and scheduled portion of each cycle (e.g., first 20 minutes of each hour for 12 hours) that the chlorinator will be active. Accordingly, independent of discrete amounts of chlorine generated by the chlorinator for the cyclical runtimes or total runtime specified the operation command, as estimated by the management controller, the management controller can determine that the command runtime is insufficient based on an expectation of fluctuating requirements over the time period covered by the operation command.

Where the command runtime is determined sufficient in stage 550, the management controller can compare the command runtime and resource utilization levels associated with the operation command to those of the dynamic control in stage 560. Otherwise, the current dynamic control runtime settings established in stage 530 and/or stage 532 can be implemented in stage 570.

Turning to stage 560, the management controller can compare runtimes for the dynamic control and the operation command. In one example, the management controller can determine a dynamic control runtime for comparison, as a projection of total runtime over a future period of time based on an assessment of potential environmental factors over that period that may impact chlorine demand. In another example, the management controller may simply determine whether or not chlorine must be generated in that instant of time an evaluation in stage 560 is being performed.

More often than not, the dynamic control will result in less runtime for the chlorinator since it will be demand based. However, operating according to the operation command may have other benefits, such as a reduced processing load on the management controller over a certain period of time.

At stage 562, the management controller can implement or permit the implementation of the operation command where at least one of the conditions in stage 560 is satisfied. In one example, the management controller can continue to log what runtime values would result from a dynamic control override in stage 564. In this way, a user may be a able to see how much runtime is not being saved by giving different degrees of weight to resource utilization and choosing a degree that best meets that user's preference.

Where the command runtime is insufficient for required sanitation level or neither of the conditions are satisfied in stage 560, the management controller can implement the dynamic runtime settings in stage 570 and log this override in an internal storage and/or with the COMC backend.

In stage 580, the management controller can update the used runtime for the chlorinator (or chlorinator cell), and log and report the response to the operation command at stage 590.

It will be understood that execution of some or all stages of the exemplary method of FIG. 5 may be included in various stages of the method of FIG. 2 described above.

Figure 6:
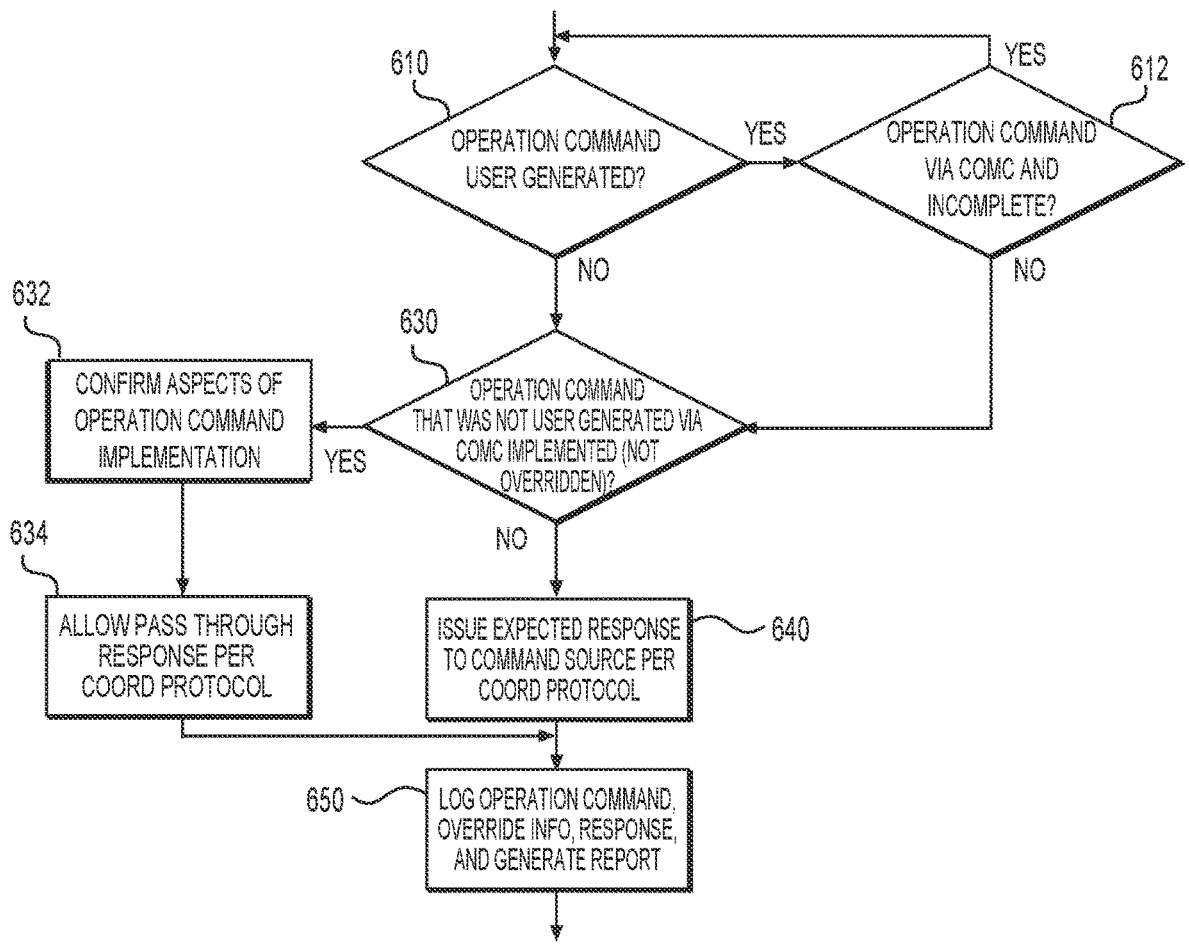
FIG. 6 is an algorithmic flowchart illustrating an exemplary method for coordinating fluid system component operations based on a source of a chlorinator operation command.

FIG. 6 is an algorithmic flowchart illustrating an exemplary method for coordinating fluid system component operations based on a source of a chlorinator operation command.

In stage 610, a management controller can determine if the operation command was user generated. If the operation command is determined not to be user generated, the management controller may perform a pair of evaluations related to overrides in stage 630 as discussed below. Otherwise, the pair of conditions related to an origin and state of an operation command may be evaluated in stage 612.

In one example, the management controller can communicate with an external controller or fluid system FSC panel according to a current coordination protocol and request information on an origin of the operation command. Such information may identify, or be used by the management controller to identify, what component or process generated or received the operation command. For example, an FSC panel or external controller may respond with information that the operation command was received through a respective user interface, and thus was user generated. In other examples, the management controller can refer to stored information about components of the fluid system, particularly those that are exclusively operated manually, and determine that an operation command was user generated.

For situation where the operation command was user generated via the management controller, a check may be performed to see if the command operation has been completed in stage 612, and through subsequent iterations of stages 610 and 612. In this way, priority is given to user generated operation commands that indicate a user is aware of the management controller and desires a certain chlorinator operation not be overridden. On the other hand, the conditions in stage 630 will be evaluated if: (1) the operation command is not user-generated as determined in stage 610; or (2) the management controller determines in stage 612 that the operation command is: (A) COMC-generated and complete; or (B) user generated, but not generated through the management controller.

In stage 630, the management controller may analyze whether the operation command was overridden in leu of chlorine demand-based dynamic control. More specifically, in stage 630, the management controller may recognize: (1) an implementation of an operation command that (2) was generated from an operation command source not including the management controller or a COMC backend. Thus, if both conditions are true, the management controller may confirm aspects of the implementation of the operation command in stage 632 and allow a pass-through response to be conveyed in stage 634.

The management controller is configured to effectively override a percentage-of-cycle-based operation scheme promulgated by an FSC panel. In addition, the management controller may also be configured to monitor for user input changes received by the FSC panel and give priority to this input in certain situations. For example, the management controller may store such input as user-desired settings that the management controller defaults to if there is any error with the measurements for pH, ORP, temperature, or other tracked fluid conditions. In another example, the user input values may be defaulted to where certain fluid conditions are out of ranges (e.g., as may be determined in stages 330 or 382) for which the management controller can exercise dynamic control over the chlorinator.

At stage 632, aspects of an implementation of the operation command may be confirmed. In some examples this may include checking if a correct legacy control pre-set setting has been selected, a pH level is outside of a range for dynamic control, or as user desired setting is being implemented. In another example, stage 632 may the management controller confirming that the chlorinator is active and inactive according to the control scheme associated with the operation command.

In stage 634, the management controller may simply allow a communication signal that a legacy control would transmit to an operation command source to pass through the management controller and be delivered to the operation command source. As a result, the management controller may utilize less processing resources since a determination of what the operation command source expects, and potential generation thereof, is not performed.

Turning back to stage 630, if the operation command was user generated through the management controller or overridden, the management controller may progress from stage 630 and issue an expected response to the command source in stage 640.

In stage 650, the management controller may log the operation command, override information (if override was executed), any response or communication to the command source in response to the operation command and generate a report including some or all the above-mentioned information.

It will be understood that execution of some or all stages of the exemplary method of FIG. 6 may be included in various stages of the method of FIG. 2 described above.

Figure 7:
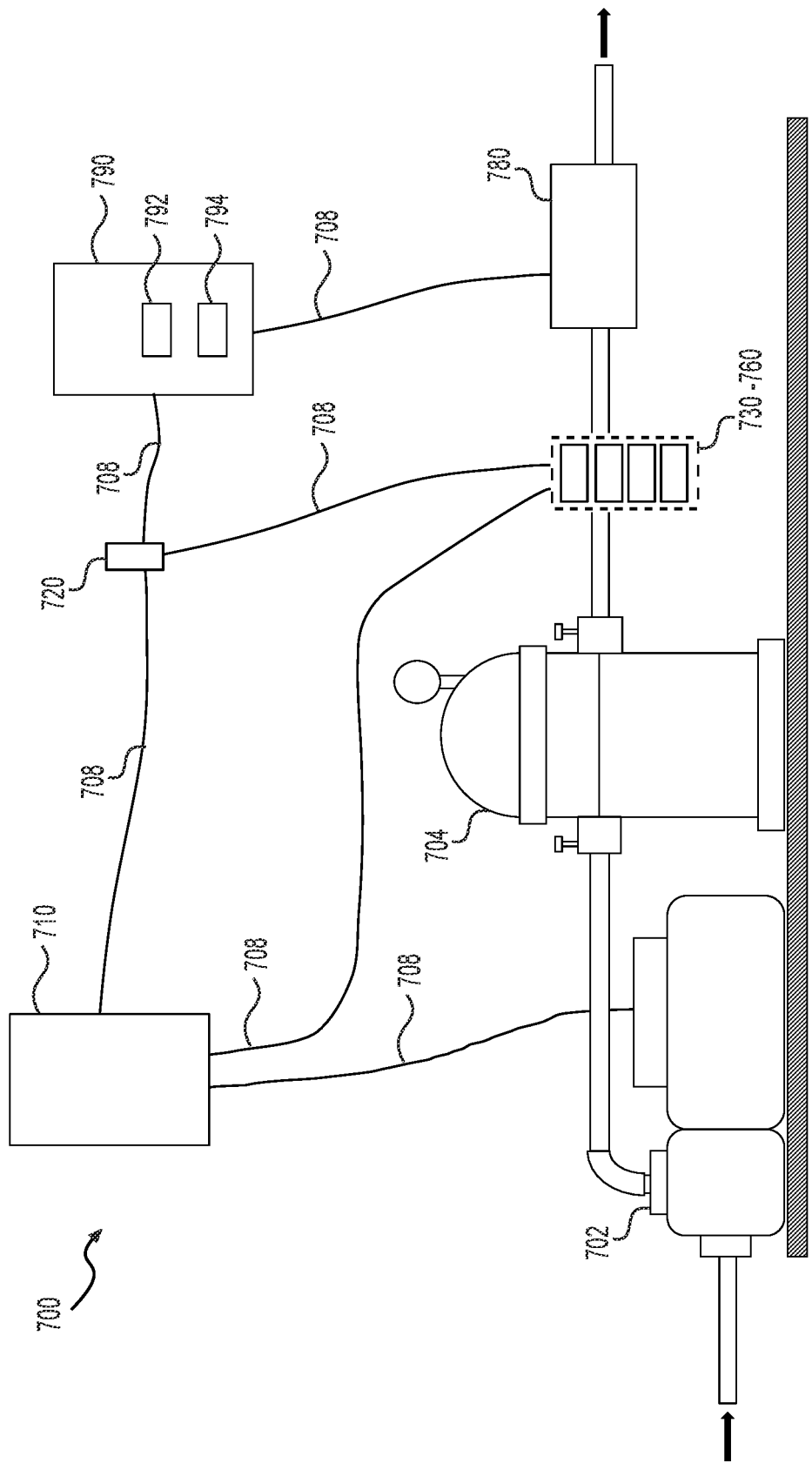
FIG. 7 illustrates an example fluid system including an exemplary chlorinator management controller, according to an aspect of the present disclosure.

FIG. 7 illustrates an example fluid system 700 including an exemplary chlorinator operation management controller 720 ("management controller 720"), according to an aspect of the present disclosure. The fluid system 700 may include a pump 702, a filter 704, fluid condition sensors 730-760, and a chlorinator 780. In one example, the fluid system 700 may define a portion of a fluid circuit that circulates fluid as part of an overall operation of a particular feature, an apparatus, or fluid application, such as a pool and/or a spa (not shown). The fluid condition sensors may include a pH sensor 730, an ORP sensor 740, a temperature sensor 750, and one or more flow sensors 760. As discussed above, other fluid condition sensors that may be included may detect dissolved oxygen, alkalinity, salinity, water hardness, nitrates, calcium, and the like.

The fluid system 700 further includes an FSC panel 710, a power actuator 790, and the management controller 720. Like other examples described herein, the FSC panel 710 may be configured for installation in fluid systems, such as pools and spas, to initiate, monitor, and control functions of equipment generally responsible for, or encompassing of, overall fluid system operation. The FSC panel 710 may be communicatively connected (directly) to the pump 702, the fluid condition sensors 730-760, and the management controller 720 via connectors, wires, optical devices, or the like, suitable for carrying data, and in some cases transmitting power, between devices (hereafter "connectors 708"). It will be understood that the connectors 708 may include any type of data carrying device and may be different from one another. In addition, each connector 708, or pair of connectors 708, may be specific to the fluid system components communicatively connected thereby.

Turning operation of the fluid system, fluid may flow under pressure to an inlet of the pump 702. The pump 702, under the control of the FSC panel 710, conveys the fluid through the filter 704, past the fluid sensors 706, and through the chlorinator 780. In one example, control of the pump 702 by the FSC panel 710 may be dependent upon or otherwise responsive to information from the pump 702 and the fluid sensors 730-760, as received, processed, and interpreted by the FSC panel 710. It should be noted that in one example, control of the pump 702 may be responsive to information conveyed from the management controller 720 to the FSC panel 710.

From the chlorinator 780, the fluid may be circulated through a remainder of the fluid system 700 not shown, such that at least a portion of the fluid is returned to and subsequently conveyed by the pump 702. The chlorinator 780 is connected to the power actuator 790 by one or more connectors 708 may carry at least power to the chlorinator 780. In one example, the power actuator 790 includes a power supply 792 and a legacy control 794 that respectively transmit power and data/communications to the chlorinator 780. In some examples, the power supply 792 may include a transformer that steps down a high voltage power signal from the FSC panel 710, or another source, to a voltage suitable for powering other components (e.g., the legacy control 794) and devices that are part of the fluid system 700. In one example, the management controller 720 may be powered by the power supply 792. In another example, the management controller 720 may be powered via the FSC panel 710. Together, the power supply 792 and the legacy control 794 may actuate the chlorinator 780 to generate chlorine, but operational control of that actuation lies with the management controller 720, as described in more detail with reference to FIG. 8.

Figure 8:
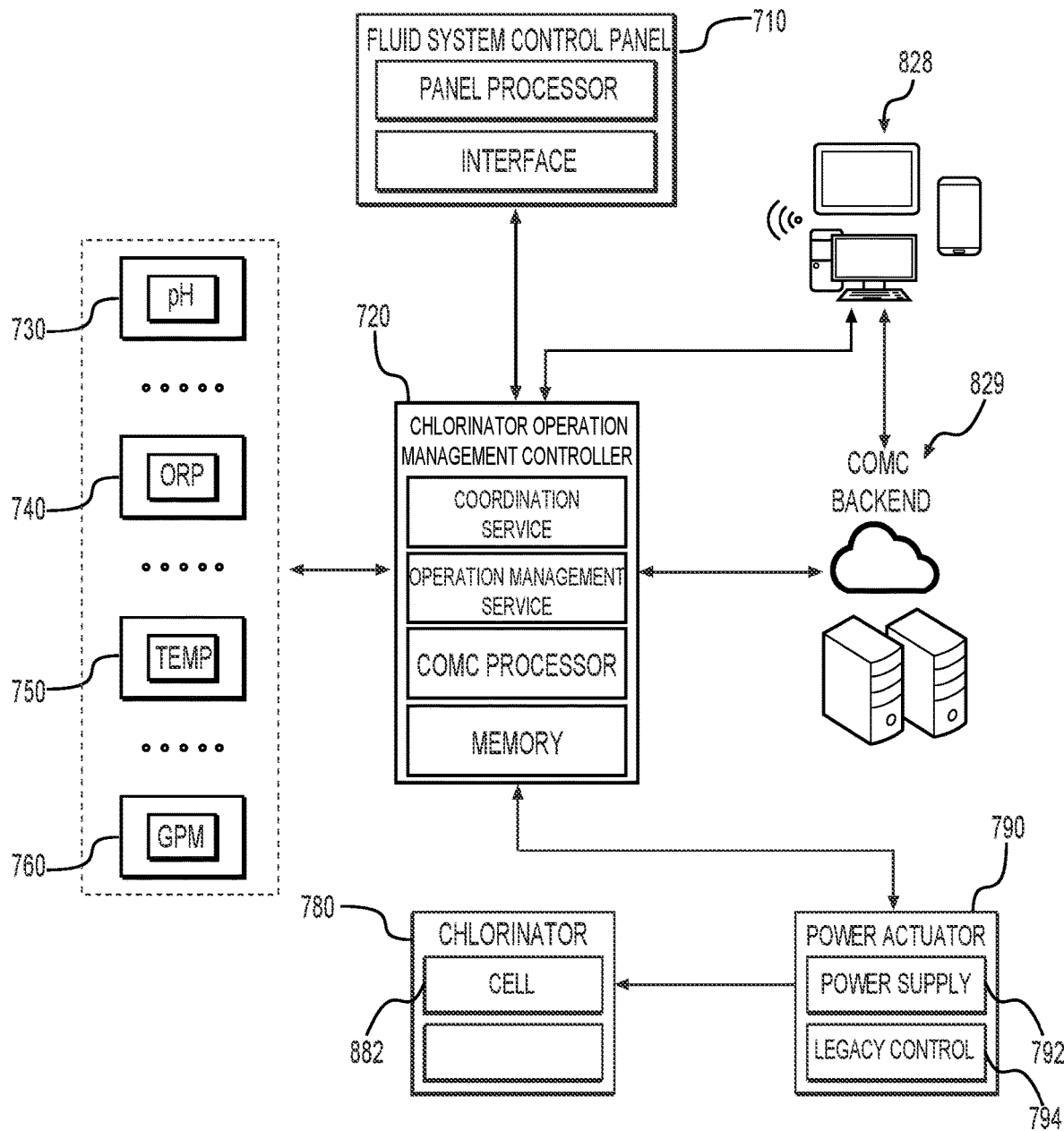
FIG. 8 illustrates a schematic of example system components for a fluid system including an exemplary chlorinator management controller, according to an aspect of the present disclosure.

FIG. 8 illustrates a schematic of example system components for the fluid system 700 including the exemplary chlorinator management controller 720. In addition to those components already discussed with reference to FIG. 7, a cell 882 for the exemplary chlorinator 780 is illustrated in FIG. 8 along with a user device 828 and a COMC backend 829. The user device 828 and the COMC backend 829 may be in communication with the management controller 720.

Additionally, in some examples, the user device 828, and in limited instances the COMC backend 829, may communicate with the FSC panel 710.

In one example, the FSC panel 710 can include a panel processor and an interface as shown. The FSC panel 710 may do any or all of monitoring, scheduling, cycling, controlling, and/or issuing alerts for operations of: pumps, filtering systems, laminar jets, massaging jets, automated cleaning and/or chemical dispersal systems, and other equipment needed for the general operations required to maintain a fluid system, such as a pool and/or spa, in an operational or otherwise usable state. In some examples, the FSC panel 710 may be capable of being used as a main control of a large multi-component pool automation system that dictates the operations of many pieces of equipment associated with a pool and/or spa. The FSC panel 710 can be used to coordinate operations of one device or group of devices relative to another device or group of devices. In some examples, various relays provided by the FSC panel 710 may be utilized for independent control of various devices connected, directly or indirectly, to the FSC panel 710.

The management controller 720 may include a coordination service, an operation management service, a COMC processor, and a memory as described herein. As shown, the management controller 720 may be configured to communicate with the FSC panel 710, the fluid condition sensors 730-760, the user device 828, the backend 829, and the power actuator 790.

The user device 828 may be optionally provided and in communication with the management controller 720 and/or the COMC backend 829. The user device 828 may include a computing device with a processor, memory storage, and non-transitory computer-readable medium containing instructions that are executed by the processor. In addition, the user device 828 may include one singular computing device (e.g., a phone, tablet, laptop, desktop computer, other digital processing device) or a network of computing devices.

Each of the services running or otherwise being implemented on the management controller or, in some cases, the user device 828, can be part of or configured to be compatible with a software product (e.g., a dedicated mobile application, a web application, etc.) that may be at least partially provided by the COMC backend 829. The software product can provide tools for system management, communication and coordination, modeling, data formatting, tracking operations, generating selectable options in and supporting selections made through a UI, and any other relevant features.

In one example, the COMC backend 829 can include one or more physical servers, and or cloud-based virtual servers that support the services (or agents) operating on other system components. The COMC backend 829 may be supported by one or more repositories (not shown). According to an aspect of the present disclosure, each of these repositories can be a database of operation, runtime, and fluid condition data that is hosted on one or more servers. In another example, one or more of the repositories can be a cloud-based storage component that is part of an infrastructure that includes various computing devices (e.g., user devices and wearable devices) and cloud-based services interconnected by local networks, wide-area networks, wireless communications, and the Internet.

Further, the COMC backend 829 can be provided with software-based tools through which an administrator can monitor, manage, update, and modify aspects of coordination or operation management services, for example, that are being implemented on the management controller 720. In addition, separate and apart from processes involving the management controller 720, the COMC backend 829 may implement protocols to manage chlorinator operations and/or provide an administrator with tools to do the same. For example, the management controller 720 may cease to have power when the FSC panel 710, or a wall timer in other examples, disconnects power to the chlorinator 780 which includes the chlorinator cell 782. The COMC backend 829 may be configured to differentiate between a scheduled power off operation and a problem with a power connection at the management controller 720, and issue an alert to an administrator or other type of user in the latter case.

Connectivity between the COMC backend 829 and one management controller or a network of management controllers provides many opportunities to improve long term operations of chlorinators and fluid systems. For example, through the COMC backend 829 and respective user devices 828, end users, which may include fluid system operators, owners, installers, or maintenance technicians, may be able to access information from individual management controllers and monitor or change chlorinator operations locally or remotely. In addition, the management controllers and/or the COMC backend 829 may be configured to issue alerts that directly reach these end users and advise of current fluid conditions or aspects of future operations of the chlorinator (e.g., total runtime is less than a predetermined level and should be replaced). In addition, the COMC backend 829 may be utilized to disseminate information specific or common to all management controllers connected to the COMC backend 829. Unlike other solutions that connect FSC panels, for example, applications running on the user devices, such as the user devices 828 shown in FIG. 8, may be dedicated to management controllers and chlorinators.

Generally, a management controller according to the present disclosure may be configured to: (1) simulate outputs corresponding to those resulting from communications between a legacy control and a chlorinator cell; and (2) disseminate those outputs to an FSC panel in information packets according to a communication protocol previously established between the FSC panel and the chlorinator. In doing so, the management controller represents that communication between the chlorinator cell and the legacy control is intact, otherwise the FSC panel may determine the chlorinator is not functioning correctly, or at all, and may stop operations of other components of a fluid system including the chlorinator.

The management controller can be configured according to a specific operation command source and/or a chlorinator currently installed in the fluid system. This can include being able to operate according to communication protocols unique to specific manufacturers (e.g., GOLDLINE, HAYWARD, PENTAIR) for the operation command source and the chlorinator (unless the chlorinator is a standalone device and thus defines the operation command source). In other examples, the management controller may be configured according to several communication protocols and able to identify which protocol is appropriate for a particular fluid system by gathering information from an FSC panel and/or a chlorinator. Thus, the management controller may be configured to obtain pH and ORP readings and adjust a chlorine level by changing an active/inactive state of a chlorinator whether the fluid system includes: (A) a standalone chlorinator; (B) a combination of one of the operation command sources described herein and a chlorinator with a legacy control; or (C) some intermediate device that polls fluid condition values.

In the case of the fluid system 700, the management controller 720 may function as an interface and an interrupt between the FSC panel 710 and the legacy control 794. This may particularly be the case where the FSC panel 710 and the power actuator 790 including the legacy control 794 were installed and operated normally by communicating directly with one another prior to installation of the management controller 720. In one example, the legacy control 794 may have communicated with the FSC panel 710 according to a communication protocol, such as RS485. Accordingly, the management controller 720 may be configured with first and second interfaces (e.g., connectors, opto-isolators, optical readers, etc.) configured according to the same communication protocol previously utilized by the FSC panel 710 and the legacy control 794. Thus, in the case of RS485, the management controller may include a first RS485 interface configured to communicate with the FSC panel 710 and a second RS485 interface capable of connecting to the chlorinator 780 via the legacy control 794.

The management controller 720 may request operation commands and additional information from the FSC panel 710. The request for additional information may be based on an analysis of an internal knowledge bank (via memory or a backend) and what information it has received and a determination that more information is needed to operate the chlorinator 780. If more information is needed, the management controller 720 can request it from the FSC panel 710 and/or the legacy control 794. Otherwise, the management controller 720 may communicate directly with the legacy control 794 serving the chlorinator 780 based on the operation command received from the fluid condition sensors 730-760. As shown, the intermediate interface provided by the management controller 720 can be connected to and receive information from one or more fluid condition sensors such as sensors 730-760.

The management controller 720 will receive operation commands from the FSC panel 710, interpret the operation commands, and determine what information needs to be included in information packages for the legacy control 794 for the chlorinator 780. In addition, the management controller 720 may determine what information from the operation command needs to be retained or otherwise not conveyed to the legacy control 794. However, operation commands from the FSC panel 710 will not be implemented unless: (1) a required sanitation level will be obtained and/or maintained; and (2) the operation command, over time periods specified therein, requires less (A) runtime, or (B) resources. Otherwise, the operation commands from the FSC panel 710 will in effect, be overridden for the dynamic chlorine demand-based control implemented by the management controller 720.

Whether or not operation commands are being received or implemented, the management controller 720 may continuously pull or otherwise be fed information from fluid condition sensors 730-760 according to a predefined (but modifiable) sampling rate. In one example, the sampling rate may be adjusted in situations where the management controller 720 is implementing a hybrid control scheme that combines dynamic control with percentage of cycle-based control. More specifically, the management controller 720 may be configured to determine a chlorine demand based at least on pH and ORP values. And, if there is a demand, select one of the pre-set operation settings of the legacy control 794 that keeps the chlorinator in an active state at least as long as an amount of time till the next sampling of values from the fluid condition sensors 730-760. After the next sampling, the management controller 720 may determine that the previous chlorine demand has been satisfied and the chlorinator 780 can go into an inactive state until the next sampling. Alternatively, the management controller 720 may determine that the chlorine demand has not been satisfied but the chlorinator does not need to be active for the entirety of time until the next scheduled sampling. In this example, the management controller 720 may be configured to increase the sampling rate so that an analysis of chlorine demand occurs sooner.

Generally, a management controller according to the present disclosure may obtain power from a power supply for a chlorinator. In this configuration, the management controller may effectively operate as an interrupt between an FSC panel and the combined power supply and legacy control such that when the FSC panel requests fluid conditions from the chlorinator, the management controller receives that request, polls the fluid conditions sensors for the chlorinator, and answers the FSC panel on behalf of the chlorinator. In this way, the chlorinator is still subject to only one master, which is the management controller.

In the case of the fluid system 700, prior to installation of the management controller, the chlorinator 780 may have been plugged into the power actuator 790 to receive power and operating signals from the power supply 792 and the legacy control 794, respectively. With the management control 720 installed, the management controller 720 is plugged into the power actuator 790, powered by the power supply 792, transmits power to the chlorinator 780, and in some examples, transmits power to one or more fluid condition sensors 730-760.

Absent the management controller 720, the legacy control 794 may be able to cause the power actuator 790 to operatively connect the power supply 792 to the chlorinator 790 so that the chlorinator cell 882 is active and generates chlorine for one of four or five percentage values of a pre-defined interval, for each pre-defined interval over a total period of time. But, without the management controller 720, the legacy control 794 is only able to implement one of the select few pre-set control settings. The FSC panel 710, absent the management controller 720, may be able to select and instruct the legacy control 794 to implement one of the settings where, the power supply is connected to the cell 882, and the cell 882 generates chlorine for the first 50% of each of the next 4 hours. However, unlike chlorinator operations managed by the management controller 720, none of the control settings are dynamically responsive to any fluid conditions, let alone chlorine demand based on a detected chlorine level.

Figure 9:
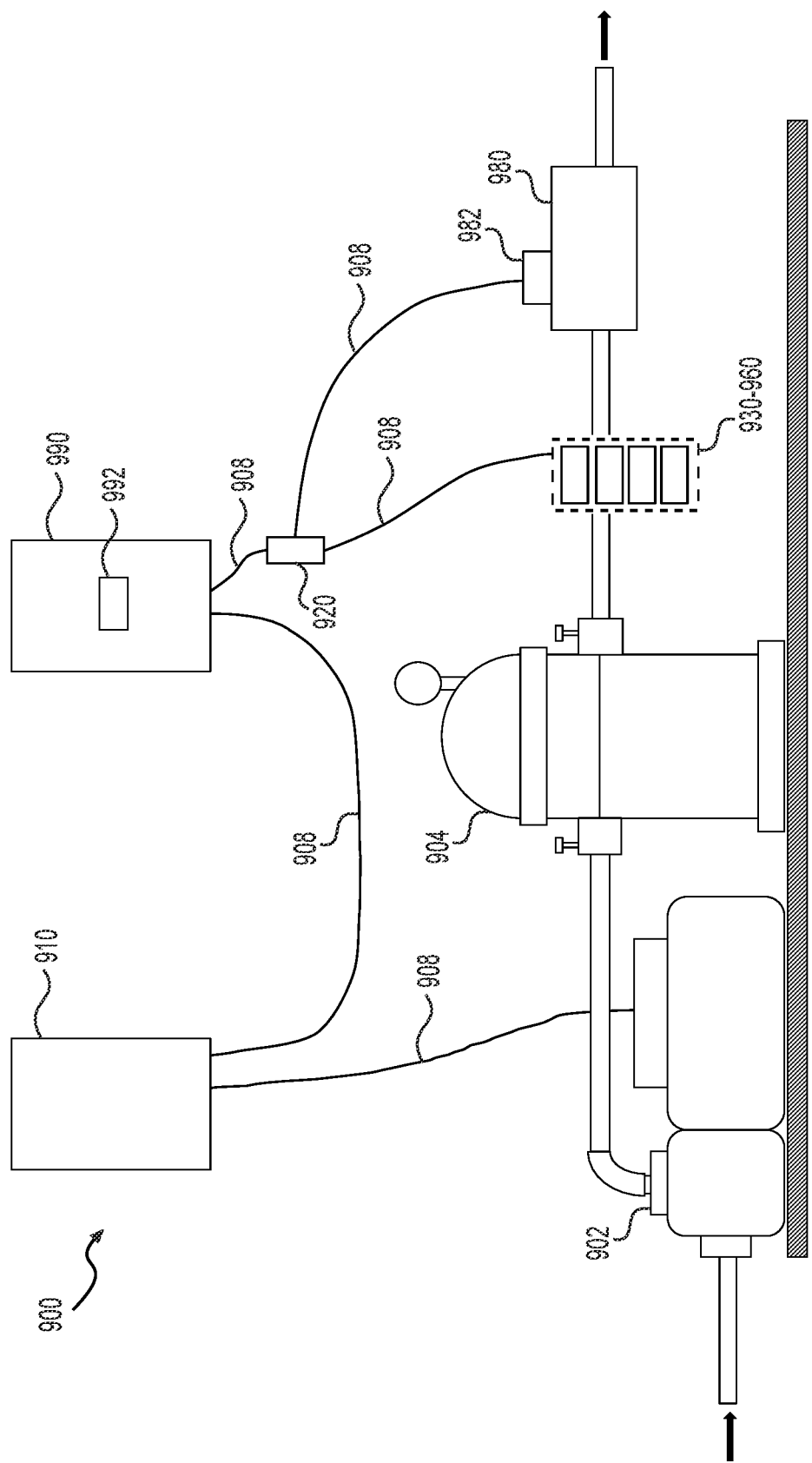
FIG. 9 illustrates an example fluid system including an exemplary chlorinator management controller, according to an aspect of the present disclosure.

FIG. 9 illustrates an example fluid system 900 including an exemplary chlorinator management controller 920, according to an aspect of the present disclosure. Similar to the fluid system 700 of FIG. 7, the fluid system 900 includes a pump 902, a filter 904, and fluid condition sensors 930-960. The fluid condition sensors 930-960 may detect the same fluid conditions and perform the same functions as their counterparts in the fluid system 700 of FIG. 7.

As shown, the management controller 920 may be communicatively connected to a chlorinator 980 and the fluid condition sensors 930-960. More specifically, the management controller 920 can communicate and transfer data with each of the fluid condition sensors 930-960 and a legacy control 982 provided with the chlorinator 980. In addition to a power connection discussed in more detail below, the management controller 920 may have a data/communication connection with the power actuator 990. However, in some examples, such a connection may provide a data/communications link between the management controller 920 and a chlorinator operation command source 910 ("operation command source 910"). In some examples, a timer box may be provided as the operation command source 910. In other examples, an FSC panel 910 similar to the FSC panel 710 in FIG. 7 may be provided as the command source 910.

The connection to the management controller 920 mentioned above may be facilitated by: (1) a connector 908 between the command source 910 and the power actuator 990; and (2) a communications module, processor, conduit, or other device provided in the power actuator 990. At least where the command source 910 includes an FSC panel, a device provided to allow data/communication transfer may be configured to enable two-way communication/data transfer between the command source 910 and the management controller 920.

The management controller 920 may be configured to be powered by, and transmit power from, a power supply 992 of the power actuator 990. In particular, power for the legacy control 982, and an ultimate supply of power that dictates an active/inactive status of a chlorinator cell, may be transmitted by the management controller 920.

Figure 10:
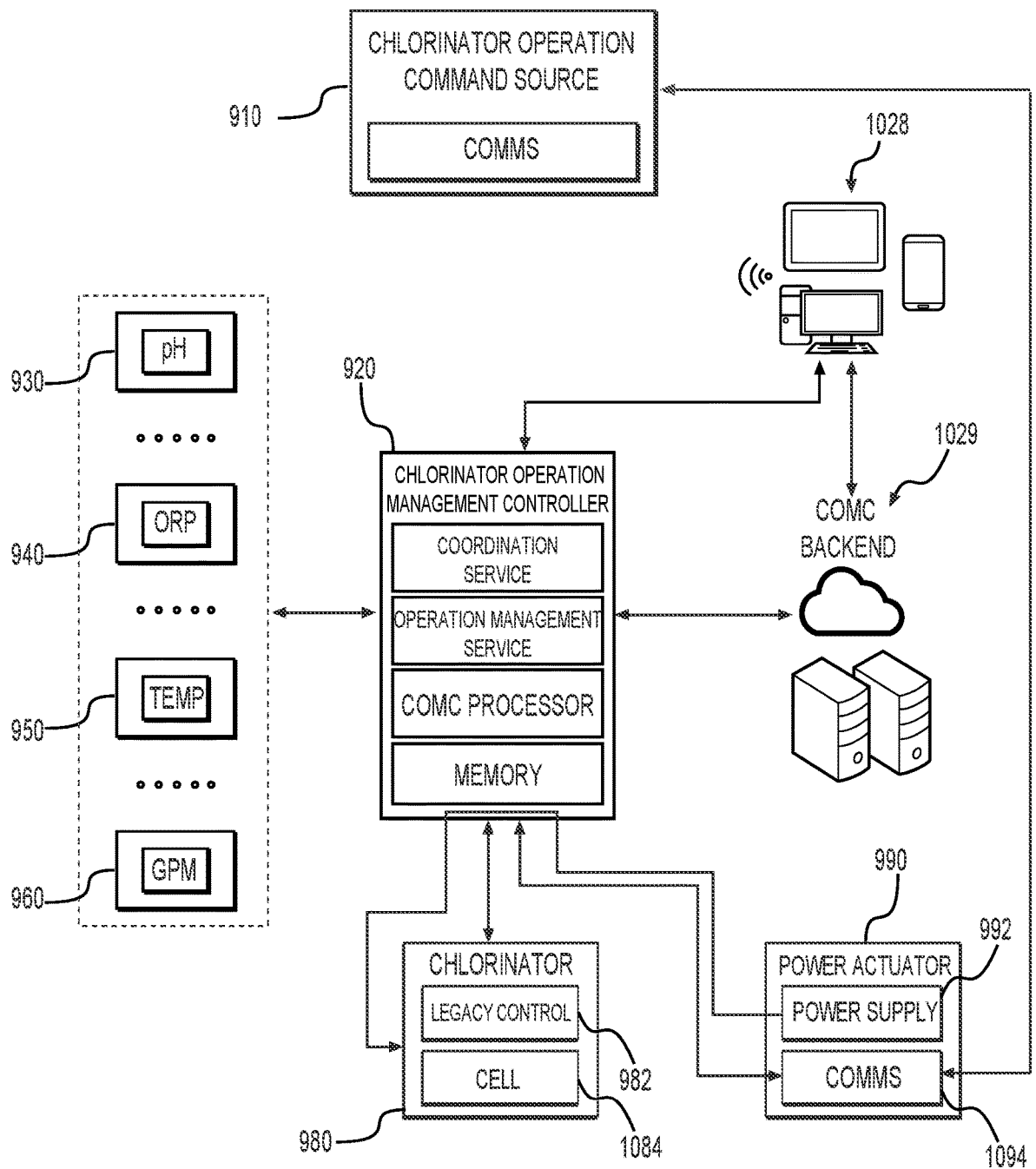
FIG. 10 illustrates a schematic of example system components for a fluid system including an exemplary chlorinator management controller, according to an aspect of the present disclosure.

FIG. 10 illustrates a schematic of example system components for the fluid system 900 of FIG. 9. In addition to those components illustrated in FIG. 9, a generic communications module for the command source 910, components of the management controller 920, a chlorinator cell 1084 for the chlorinator 980, and a communications module 1094 of the power actuator 990 are illustrated in FIG. 10.

Inside the power actuator 990, power goes into a transformer which may take 110 volts and step it down to 40 volts. In one example, the power actuator 990 may include a communication module 1094 (such as an RS485 connector) field-effect transistors, and a fuse. Connection points on the power actuator 990 may include one set of wires or pins that are power out (may carry up to 12 volts) from the transformer. Another set of wires or pins may be part of the communication module 1094 and can pass along data but do not carry any power.

In practice, absent the management controller 920, the power out wire/pins may be connected to the chlorinator cell 1084. Where the chlorinator operation command source is an FSC panel, the FSC panel can be connected to the communications module 1094 which may pick up communications from the FSC panel and pass them through to the chlorinator 980 (i.e., the legacy control 982). The set of power pins on the power actuator power the chlorinator cell. However, there is no legacy control for the chlorinator 980 in the power actuator 980, only the power supply 992. Thus, in this hypothetical, but common, configuration, the legacy control 982 does all the work of operating the chlorinator 980. That is unless there is an external controller.

In some examples where the operation command source 910 includes an FSC panel, absent the management controller 920, there would be no communication between the legacy control 982 and the operation command source 910 because there is no communication line coming into the legacy control 982 that also has power on it. This is the case for many products by certain manufacturers in certain industries that involve fluid systems. However, with the management controller 920 installed, the management controller 920 is powered by the power supply 992 and connected to the legacy control 982 via a connector 908 carrying both power and communications.

Continuing with the previous example, as a result of having power and communications (e.g., RS485) on the same line, the management controller 920 can essentially use the legacy control 982 as a pass through (e.g., switching the legacy control 982 on and off for active and inactive states of a chlorinator cell) and take over the chlorinator 980 operations. Further, the management controller 920 may use the communication module 1094 in the power actuator 990 to communicate with the FSC panel provided as the operation command source 910. Thus, the management controller 920 can transform an open loop system, at least with respect to the chlorinator 980, into a closed loop system. In addition, since the management controller 920 can transmit power from the power actuator 990 and effectively power the legacy control 982, the management controller 920 may also power one or more fluid condition sensors 930-960. Still further, since management controller 920 can communicate with the operation command source 910 via the communication module 1094, it can serve as a bypass for providing the fluid condition information from the fluid condition sensors 930-960 to the operation command source 910.

On the other hand, the management controller 920 is equally applicable to the fluid system 900 where the operation command source 910 does not implement any type of automation, as would be provided by a control panel, but rather is a timer box or the like. This is because the management controller 920 can carry power and communications (e.g., RS485) on the same line to the chlorinator 980 and thereby supply power to the chlorination cell 1084 and power and communications to the legacy control 982. Accordingly, no automation system is required for the management controller 920 to be installed in a fluid system and generate chlorine by dynamically controlling chlorinator operations based on demand.

In either of the configurations described above, all that is required to take over control of the chlorinator 980 is to plug the management controller 920 into a port of the power actuator 990 that is normally connected to the chlorinator 980. The power actuator 990 nor the chlorinator 980 need to be opened and rewired, but rather respectively connected to the management controller 920 as they would be connected to each other absent the management controller 920.

Figure 11:
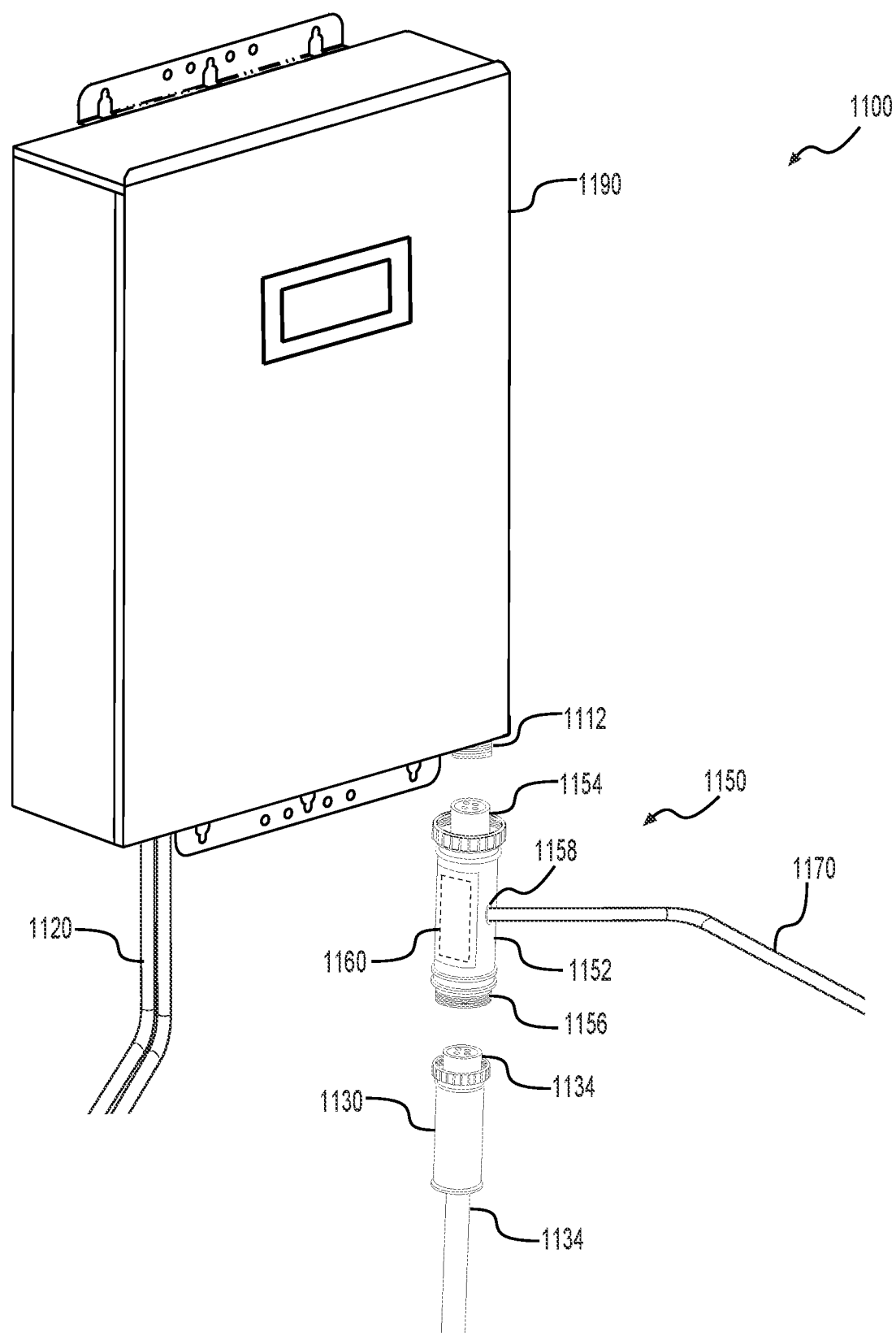
FIG. 11 illustrates example components for a fluid system including an exemplary chlorinator management controller, according to an aspect of the present disclosure.

FIG. 11 illustrates example components 1100 for a fluid system including an exemplary chlorinator management controller 1150, according to an aspect of the present disclosure. FIG. 11 shows the management controller 1150 as disconnected from a power actuator 1190 and a chlorinator cable 1130 for a chlorinator (not shown). The power actuator 1190 may include any of the features of any of the power actuators described herein. A cable bundle 1120 is connected to the power actuator 1190 and may carry power and/or data to and/or from the power actuator 1190. The power actuator 1190 further includes a first connector port 1112 which provides an electrical connector.

The chlorinator cable 1130 includes a conduit 1134 in which data and power cables may be run for connecting to the chlorinator. A second connector port 1134 extends from the chlorinator cable 1130 and is connected to the data and power cables provided in the conduit 1134.

The management controller 1150 includes a housing 1152 and first and second connectors 1154, 1156 extending from the housing 1152. A terminal 1158 is provided on a side of the housing 1152 and defines a port for connecting to a data cable 1170. The data cable 1170 is configured to connect to one or more sensors (not shown). An integrated circuit and/or solid-state computing component 1160 may be provided within the housing 1152 and communicatively connected to the first connector 1154 and the second connector 1156. The first connector 1154 may be configured to connect to and transmit and/or receive power and/or data via connection to the first connector port 1112. The second connector 1156 may be configured to connect to and transmit power and/or data to the second connector port 1134.

As shown, the management controller 1150 may be configured with components to physically connect to the power actuator 1190 and the chlorinator cable 1130 via the first and second connectors 1154, 1156, respectively. In other examples, different types of connectors may be provided instead of or in addition to the first and second connectors 1154, 1156. Some examples may include components configured to connect wirelessly to the power actuator 1190 and/or the chlorinator (not shown). The connecting components, as operated by the integrated circuit and/or solid-state, may implement one or more wireless protocols (BLUETOOTH, ZIGBEE, NFC, WiFi, etc.). In addition, the management controller 1150 may be configured to: (1) connect to one component such as a sensor and/or a chlorinator including a legacy control via a wireless protocol, and (2) connect to another component such as an FSC panel and/or a power actuator using a different protocol such as RS485.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A controller for dynamically controlling chlorinator operations based on chlorine demand, the controller comprising:
   a housing including a first connector and a second connector;
   a memory storage including a non-transitory, computer-readable medium comprising instructions; and
   a computing device disposed in the housing and including a hardware-based processor that executes the instructions to carry out stages comprising:
      receiving an operation command associated with a chlorinator for a fluid system, wherein the operation command instructs the chlorinator to operate in an active state for at least one of a pre-set period of time or a pre-set number of cycles;
      estimating a remaining runtime for the chlorinator;
      accessing measured fluid conditions for fluid of the fluid system from a plurality of fluid condition sensors;
      determining a current chlorine demand based on the measured fluid conditions and a predetermined threshold for a chlorine level for the fluid of the fluid system;
      dynamically overriding the operation command by operating the chlorinator in an inactive state within the at least one of the pre-set period of time or the pre-set number of cycles, wherein the dynamic override is based on at least the current chlorine demand, the remaining runtime, and a configuration of components for the fluid system, and wherein the dynamic override maximizes a remaining service life of the chlorinator; and
      continuously tracking operational information for the chlorinator including at least the remaining runtime, wherein causing the operation of the chlorinator includes managing operations of a legacy control for the chlorinator.

2. The controller of claim 1, the stages further comprising the controller:
   obtaining fluid condition information for the fluid from the legacy control; and
   transmitting the fluid condition information to the operation command source based on the operation command.

3. The controller of claim 1, wherein causing the operation of the chlorinator includes the controller controlling a supply of power to a chlorinator cell of the chlorinator.

4. The controller of claim 3, wherein controlling the supply power to the chlorinator cell includes controlling operations of the legacy control by communicating directly with the legacy control.

5. The controller of claim 3, wherein controlling the supply power to the chlorinator cell includes controlling a supply of power to the legacy control.

6. The controller of claim 1, wherein operating the chlorinator in the inactive state within the at least one of the pre-set period of time or the pre-set number of cycles further comprises preventing the chlorinator from entering the active state within the at least one of the pre-set period of time or the pre-set number of cycles.

7. The controller of claim 1, the stages further comprising:
   the controller estimating a used runtime for the chlorinator,
   wherein the remaining runtime is determined based on a total runtime associated with the chlorinator and an updated value of the used runtime, wherein causing an operation of the chlorinator based on the remaining runtime includes determining a first threshold runtime corresponding with the current chlorine demand.

8. A method for dynamically controlling chlorinator operations based on chlorine demand, the method comprising:
   receiving an operation command associated with a chlorinator for a fluid system, wherein the operation command instructs the chlorinator to operate in an active state for at least one of a pre-set period of time or a pre-set number of cycles;
   estimating a remaining runtime for the chlorinator;
   accessing measured fluid conditions for fluid of the fluid system from a plurality of fluid condition sensors;
   determining a current chlorine demand based on the measured fluid conditions and a predetermined threshold for a chlorine level for the fluid of the fluid system;
   dynamically overriding the operation command by operating the chlorinator in an inactive state within the at least one of the pre-set period of time or the pre-set number of cycles, wherein the dynamic override is based on at least the current chlorine demand, the remaining runtime, and a configuration of components for the fluid system, and wherein the dynamic override maximizes a remaining service life of the chlorinator; and
   continuously tracking operational information for the chlorinator including at least the remaining runtime, wherein causing the operation of the chlorinator includes managing operations of a legacy control for the chlorinator.

9. The method of claim 8, further comprising:
obtaining fluid condition information from the legacy control; and
transmitting the fluid condition information to the operation command source based on the operation command.

10. The method of claim 8, wherein causing the operation of the chlorinator includes the controller controlling a supply of power to a chlorinator cell of the chlorinator.

11. The method of claim 10, wherein controlling the supply power to the chlorinator cell includes controlling operations of the legacy control by communicating directly with the legacy control.

12. The method of claim 11, wherein controlling the supply power to the chlorinator cell includes controlling a supply of power to the legacy control.

13. The method of claim 8, wherein operating the chlorinator in the inactive state within the at least one of the pre-set period of time or the pre-set number of cycles further comprises transitioning the chlorinator from the active state to the inactive state within the at least one of the pre-set period of time or the pre-set number of cycles.

14. The method of claim 8, further comprising:
estimating a used runtime for the chlorinator,
wherein the remaining runtime is determined based on a total runtime associated with the chlorinator and an updated value of the used runtime, wherein causing an operation of the chlorinator based on the remaining runtime includes determining a first threshold runtime corresponding with the current chlorine demand.

15. A non-transitory, computer-readable medium containing instructions that, when executed by a hardware-based processor, performs stages for dynamically controlling chlorinator operations based on Free Chlorine demand, the stages comprising:
receiving an operation command associated with a chlorinator for a fluid system, wherein the operation command instructs the chlorinator to operate in an active state for at least one of a pre-set period of time or a pre-set number of cycles;
estimating a remaining runtime for the chlorinator;
accessing measured fluid conditions for the fluid system from a plurality of fluid condition sensors;
determining a current chlorine demand based on the measured fluid conditions and a predetermined threshold for a chlorine level for fluid of the fluid system;
dynamically overriding the operation command by operating the chlorinator in an inactive state within the at least one of the pre-set period of time or the pre-set number of cycles, wherein the dynamic override is based on at least the current chlorine demand, the remaining runtime, and a configuration of components for the fluid system, and wherein the dynamic override maximizes a remaining service life of the chlorinator; and
continuously tracking operational information for the chlorinator including at least the remaining runtime,
wherein causing the operation of the chlorinator includes managing operations of a legacy control for the chlorinator.

16. The non-transitory, computer-readable medium of claim 15, the stages further comprising:
obtaining fluid condition information for the fluid from the legacy control; and
transmitting the fluid condition information to the operation command source based on the operation command.

17. The non-transitory, computer-readable medium of claim 15, wherein causing an operation of the chlorinator includes the controller controlling a supply of power to a chlorinator cell of the chlorinator.

18. The non-transitory, computer-readable medium of claim 17, wherein controlling the supply of power to the chlorinator cell includes controlling operations of the legacy control by communicating directly with the legacy control.

19. The non-transitory, computer-readable medium of claim 15, wherein operating the chlorinator in the inactive state within the at least one of the pre-set period of time or the pre-set number of cycles further comprises transitioning the chlorinator from the active state to the inactive state within the at least one of the pre-set period of time or the pre-set number of cycles.

20. The non-transitory, computer-readable medium of claim 15, the stages further comprising:
the controller estimating a used runtime for the chlorinator,
wherein the remaining runtime is determined based on a total runtime associated with the chlorinator and an updated value of the used runtime, wherein causing an operation of the chlorinator based on the remaining runtime includes determining a first threshold runtime corresponding with the current chlorine demand.

* * * * *